United States Patent
Perera et al.

(10) Patent No.: US 11,283,068 B2
(45) Date of Patent: Mar. 22, 2022

(54) ELECTROCHEMICALLY ACTIVE MATERIALS AND METHODS OF PREPARING THE SAME

(71) Applicant: Enevate Corporation, Irvine, CA (US)

(72) Inventors: Sanjaya D. Perera, Irvine, CA (US); Benjamin Yong Park, Mission Viejo, CA (US); Jill R. Pestana, Long Beach, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 16/723,098

(22) Filed: Dec. 20, 2019

(65) Prior Publication Data

US 2021/0193993 A1    Jun. 24, 2021

(51) Int. Cl.
| | |
|---|---|
| *H01M 4/36* | (2006.01) |
| *H01M 4/1395* | (2010.01) |
| *H01M 4/62* | (2006.01) |
| *H01M 4/38* | (2006.01) |
| *H01M 4/04* | (2006.01) |

(52) U.S. Cl.
CPC .......... *H01M 4/366* (2013.01); *H01M 4/0404* (2013.01); *H01M 4/1395* (2013.01); *H01M 4/386* (2013.01); *H01M 4/621* (2013.01)

(58) Field of Classification Search
CPC ........ H01M 4/386; H01M 4/02; H01M 4/366; H01M 2004/8684; H01L 21/56
USPC .................................. 427/212, 216, 203, 7
See application file for complete search history.

(56) References Cited

U.S. PATENT DOCUMENTS

| | | | | |
|---|---|---|---|---|
| 6,767,377 | B2* | 7/2004 | Schumacher | C09C 1/3054 106/3 |
| 2009/0246631 | A1* | 10/2009 | Hojo | H01M 4/64 429/213 |
| 2012/0202112 | A1* | 8/2012 | Yushin | H01M 4/386 429/200 |
| 2013/0071741 | A1* | 3/2013 | Ohara | H01M 4/1393 429/212 |
| 2014/0356726 | A1* | 12/2014 | Han | H01M 4/485 429/231.8 |
| 2015/0017527 | A1* | 1/2015 | Lee | H01M 4/364 429/213 |
| 2016/0372753 | A1* | 12/2016 | Fukasawa | H01M 10/0525 |
| 2018/0145312 | A1* | 5/2018 | Koike | H01M 4/133 |
| 2019/0123339 | A1* | 4/2019 | Yushin | H01M 10/0525 |

* cited by examiner

*Primary Examiner* — Tabassom Tadayyon Eslami
(74) *Attorney, Agent, or Firm* — McAndrews, Held & Malloy, Ltd.

(57) ABSTRACT

Methods of preparing an electrochemically active material can include providing electrochemically active particles, coating the particles with a binder, and exposing the particles to a source of metal. The methods can also include forming metal salt on the surface of the particles from the source of metal and heating the metal salt to form metal oxide coated particles.

19 Claims, 11 Drawing Sheets

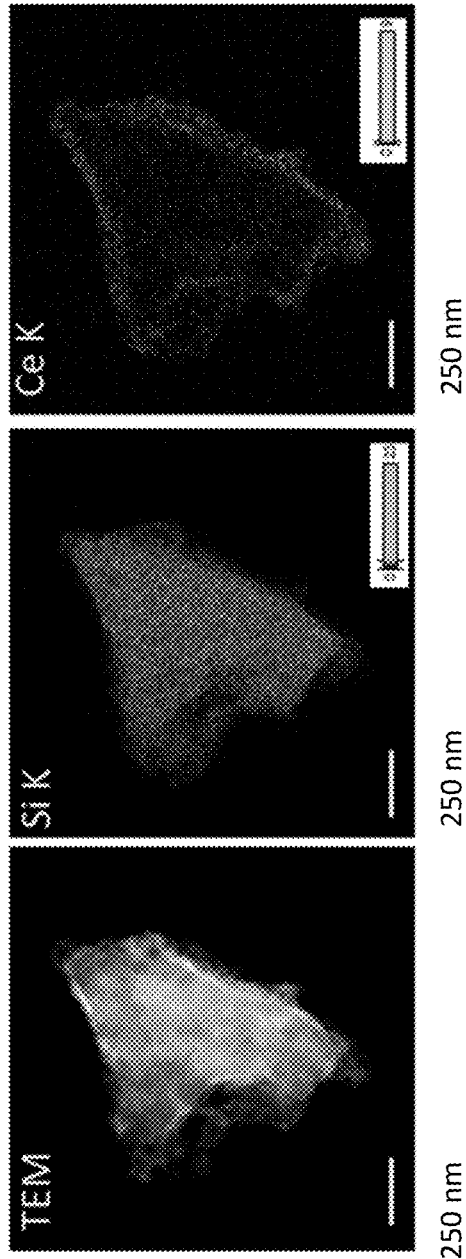

ELECTROCHEMICALLY ACTIVE MATERIALS AND METHODS OF PREPARING THE SAME

BACKGROUND

Field

The present application relates generally to electrochemically active material. In particular, the present application relates to electrochemically active material comprising metal oxide coated electrochemically active particles and to electrochemically active material comprising metal oxide additives.

DESCRIPTION OF THE RELATED ART

A lithium ion (Li-ion) battery typically includes a separator and/or electrolyte between an anode and a cathode. In one class of batteries, the separator, cathode, and anode materials are individually formed into sheets or films. Sheets of the cathode, separator, and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electrochemically active materials with the separator between them.

Novel electrode material and processes are desired for increasing demands for high energy density, long cycle life, and low-cost lithium (Li)-ion batteries in electrical vehicles (EVs). Current state-of-the-art Li-ion batteries used in EVs contain anodes comprised of carbon (graphite) and a small amount of silicon/silicon-oxide, and have limited capacity and cycle life, which can significantly restrict the performance of EVs. Therefore, low-cost, easy-to-process, and high-capacity electrode materials are desired to increase the cycle life of Li-ion batteries and improve the EV performance.

Extensive research focuses on developing silicon-based anode materials to improve energy density and cycle life of commercially available Li-ion batteries. Although silicon (Si) has exceptionally high theoretical specific capacity compared to graphite ($Li_{15}Si_4$: 3579 mAh/g, 8343 Ah/L), silicon-based anode materials suffer from large volume changes during charge and discharge cycles, which can lead to poor performance. The volume change of Si can result in subsequent pulverization of silicon, loss of electric contact, and continuous reactions with electrolyte to form solid electrolyte interphase (SEI), which can all contribute to the poor performance of Li-ion batteries with a Si-based anode. Understanding the electrochemical behavior of Si, lithiation and de-lithiation behaviors of Si, and the interphase reaction mechanisms with electrolyte can be key to improving performance of Si-based anodes. Despite the challenges in using Si as an anode material, Si is recognized as the next generation anode material that is capable of addressing the limited performance of commercial Li-ion batteries.

To realize Si as a commercially viable electrode material (e.g., a Si-dominant anode), many different approaches have been engineered and investigated. Utilization of bulk silicon in high weight percentages (wt. %) in anodes has not been the mainstream development path for many reasons. The existing work on Si anodes centers on using small amounts of Si or Si-alloy to minimize the effect of the Si pulverization. In order to increase the utilization of bulk Si microparticles as an anode material and achieve closer to their theoretical capacities, wider voltage range, or voltage window, during cycling are used. However, using a wider voltage window can cause an increased rate of capacity fade and impedance growth, and thus, poor cell performance. Significant contribution to capacity fade and resistance growth may be attributed to one or more of the following processes: (i) the volume change (~300%) of Si can accelerate the breakdown and subsequent growth of SEI upon long-term cycling, (ii) on the electrode's surfaces at potentials below ~1.5 V, reduction of the electrolytes can lead to the formation of SEI, which causes depletion of Li in the system, (iii) the presence of trace amounts of impurities, such as $H_2O$, can have the ability to degrade $LiPF_6$-based electrolytes and generate HF, which decomposes the SEI at the Si anode and leads to the accumulation of a thick and resistive film on the Si surface, and (iv) catalyzing anode decomposition reactions can accelerate the inter-particle connection with the conductive matrix of the anode. The induced stress and strain from these volume changes in Si also can result in electrode fracture and delamination of the anode from the current collector. This, in turn, can increase the cell resistance over repeated cycling. In order to achieve stable cyclability with high capacity, reducing and/or minimizing these detrimental processes are desired. The utilization of bulk Si particles (e.g., microparticles) in large percentages as an electrode material remains challenging.

Current research efforts have developed various nanostructured Si anodes, which exhibit both better specific capacity and cycle life compared to commercial carbon-based anodes. Compared to bulk Si microparticles, Si nanoparticles (e.g., 50-100 nm) do not undergo significant pulverization. Therefore, the studies of Si nanoparticles do not directly facilitate understanding of the pulverization of Si. Furthermore, these nanostructured anode materials are far from practical use due to high cost, high irreversible capacity, and poor manufacturability.

SUMMARY

In certain implementations, a method of preparing an electrochemically active material is provided. The method can include providing electrochemically active particles, coating the particles with a binder, and exposing the particles to a source of metal. The method can also include forming metal salt on the surface of the particles from the source of metal, and heating the metal salt to form metal oxide coated particles.

In various implementations, the electrochemically active particles can comprise at least one of silicon particles, germanium particles, graphite particles, and particles of an alloy metal. In some instances, the electrochemically active material can comprise silicon particles at greater than about 50% to about 99% by weight.

In some implementations, the particles can have a median particle size (D50) greater than about 1 μm to about 50 μm.

In some instances, the binder can comprise a polymer having a molecular weight in the range of about 20,000 g/mol to about 40,000 g/mol. In some instances, the polymer can have an ethylene backbone.

In some implementations, the method can further comprise adding metal oxide particles with the metal oxide coated particles. In some instances, the metal oxide particles can have a median particle size (D50) in the range of about 20 nm to about 2 μm.

In some instances, the binder can comprise a surfactant. For example, the surfactant can comprise at least one of polyvinylpyrrolidone (PVP), sodium dodecylsulfonate, sodium dodecylbenzenesulfonate, sodium dialkylsulfosuccinate, alkylbenzene sulfonates, alcohol ether sulfates, secondary alkane sulfonates, carboxymethylcellulose, cetyltrimethylammonium bromide (CTAB), (meth)acrylic acids, (meth)acrylamides, and hydroxyacrylates.

In some instances, the metal oxide can comprise $CeO_x$, wherein $1 \leq x \leq 2$.

In some methods, the source of metal can comprise at least one of ammonium cerium nitrate, cerium (IV) sulfate, cerium (III) nitrate hexahydrate, cerium (III) chloride heptahydrate, cerium trifluoromethanesulfonate, cerium (III) sulfate octahydrate, ammonium cerium (IV) sulfate dihydrate, cerium (III) sulfate, cerium (IV) sulfate tetrahydrate, cerium (III) acetate hydrate, and ammonium cerium (IV) nitrate.

In some methods, the source of metal can comprise a cerium-doped material. For example, the source of metal can comprise at least one of cerium (IV) oxide-yttria doped material, cerium-doped copper, cerium doped cobalt oxide, and cerium-doped indium oxide.

In some instances, the metal oxide can comprise at least one of $TiO_2$, $Al_2O_3$, $MoO_2$, $CuO$, $ZnO$, $SnO_2$, $Nb_2O_5$, $RuO_2$, $IrO_2$, $TiNb_2O_7$, $Zn_xFe_yO_z$, wherein $1<x,y,z<4$, and $M-Li_xO$, wherein M is a transition metal and $0.1 \leq x \leq 2$.

In some instances, the metal salt can comprise at least one of nitrates, nitrites, sulfates, sulfites, sulfonates, hydroxides, isopropoxides, oxyhydroxides, acetates, and carbonates.

In some implementations, the method can further comprise exposing the particles to urea prior to forming the metal salt on the surface of the particles.

In certain implementations, a method of making an electrode can include providing the prepared electrochemically active material, and coating the electrochemically active material on a current collector with a binder.

In certain implementations, a method of making an electrode can include providing the prepared electrochemically active material, mixing the electrochemically active material with a precursor, and pyrolyzing the precursor to convert the precursor into one or more types of carbon phases to form a composite material film. In some instances, the one or more types of carbon phases can comprise at least one of hard carbon, soft carbon, and graphene. In some instances, the composite material film can be a self-supported composite structure.

In certain implementations, a method of preparing an electrochemically active material is provided. The method can include providing silicon particles, and adding $CeO_x$ particles with the silicon particles, wherein $1 \leq x \leq 2$.

In various implementations, the electrochemically active material can comprise the silicon particles at greater than about 50% to about 99% by weight.

In some implementations, the silicon particles can have a median particle size (D50) greater than about 1 μm to about 50 μm.

In some implementations, the $CeO_x$ particles can have a median particle size (D50) in the range of about 20 nm to about 2 μm.

In certain implementations, a method of making an electrode can include providing the prepared electrochemically active material, and coating the electrochemically active material on a current collector with a binder.

In certain implementations, a method of making an electrode can include providing the prepared electrochemically active material, mixing the electrochemically active material with a precursor, and pyrolyzing the precursor to convert the precursor into one or more types of carbon phases to form a composite material film. In some instances, the one or more types of carbon phases can comprise at least one of hard carbon, soft carbon, and graphene. In some instances, the composite material film can be a self-supported composite structure.

In some instances, the $CeO_x$ particles can be embedded in the one or more types of carbon phases. In some instances, the $CeO_x$ particles can be disposed on the silicon particles.

In some instances, the one or more types of carbon phases can comprise at least one of hard carbon, soft carbon, and graphene.

In some instances, the composite material film can be a self-supported composite structure.

In certain implementations, an electrochemically active material is provided. The electrochemically active material can comprise greater than about 50% to about 99% by weight of silicon particles. The silicon particles can have a median particle size (D50) greater than about 1 μm to about 50 μm. The electrochemically active material can also comprise $CeO_x$ coated on the silicon particles, wherein $1 \leq x \leq 2$.

In some instances, the electrochemically active material can comprise the silicon particles at about 70% to about 99% by weight. In some instances, the electrochemically active material can comprise the silicon particles at about 75% to about 99% by weight. In some instances, the electrochemically active material can comprise the silicon particles at about 75% to about 90% by weight.

In some electrochemically active materials, the D50 of the silicon particles can be greater than about 4 μm.

In some electrochemically active materials, the silicon particles can be substantially polycrystalline.

In some instances, the silicon particles can be surrounded by the $CeO_x$ coating.

In some instances, the electrochemically active material can comprise the $CeO_x$ at about 0.1% to about 10% by weight. For example, the material can comprise the $CeO_x$ at about 1% to about 5% by weight.

In some instances, the $CeO_x$ coating can comprise nanofeatures of about 1 nm to about 50 nm.

In some instances, the $CeO_x$ coating can have a thickness of about 1 nm to about 500 nm. For example, the $CeO_x$ coating can have a thickness of about 5 nm to about 100 nm. As another example, the $CeO_x$ coating can have a thickness of about 5 nm to about 60 nm.

In certain implementations, an electrode can include the electrochemically active material, a binder, and a current collector. The electrochemically active material can be coated on the current collector with the binder.

In certain implementations, an electrode can include the electrochemically active material. The electrode can comprise a film with the $CeO_2$ coated silicon particles distributed in a matrix comprising one or more carbon phases. In some instances, the one or more types of carbon phases can comprise at least one of hard carbon, soft carbon, and graphene. In some instances, the film can be a self-supported composite structure. In some electrodes, the film can be attached to a current collector. In some electrodes, the electrode can be a negative electrode.

In certain implementations, an electrochemical device can include a first electrode comprising the electrode, a second electrode, and electrolyte. In some instances, the electrochemical device can be a battery. In some instances, the battery can be a lithium-ion battery.

In certain implementations, an electrochemically active material is provided. The electrochemically active material can comprise greater than about 50% to about 99% by weight of silicon particles. The silicon particles can have a median particle size (D50) greater than about 1 µm to about 50 µm. The electrochemically active material can also comprise $CeO_x$ particles, wherein $1 \leq x \leq 2$.

In some instances, the electrochemically active material can comprise the silicon particles at about 70% to about 99% by weight. In some instances, the electrochemically active material can comprise the silicon particles at about 75% to about 99% by weight. In some instances, the electrochemically active material can comprise the silicon particles at about 75% to about 90% by weight.

In some instances, the D50 of the silicon particles can be greater than about 4 µm.

In some instances, the $CeO_x$ particles can have a median particle size (D50) in the range of about 20 nm to about 2 µm.

In certain implementations, an electrode can comprise the electrochemically active material, a binder, and a current collector. The electrochemically active material can be coated on the current collector with the binder.

In certain implementations, an electrode can comprise the electrochemically active material. The electrode can comprise a film with the silicon particles and $CeO_x$ particles distributed in a matrix comprising one or more carbon phases. In some instances, the one or more types of carbon phases can comprise at least one of hard carbon, soft carbon, and graphene. In some instances, the film can be a self-supported composite structure. In some instances, the film can be attached to a current collector. In some instances, the electrode can be a negative electrode.

In certain implementations, an electrochemical device can include a first electrode comprising the electrode, a second electrode, a separator, and electrolyte. In some instances, the electrochemical device can be a battery. In some instances, the battery can be a lithium-ion battery.

BRIEF DESCRIPTION OF THE DRAWINGS

FIGS. 6A, 6B, and 6C are transmission electron microscopy (TEM) images and corresponding EDS mapping of Ce on the surface of Si particles.

DETAILED DESCRIPTION

Silicon (Si) and silicon oxides have been intensively investigated as electrode materials for next-generation lithium-ion batteries due to their high capacity. The commercial use of low-cost Si microparticles, as opposed to more expensive Si nanoparticles, as a dominant anode material in lithium-ion batteries has not been implemented successfully for several reasons. Si microparticles pulverize and disintegrate during lithiation and dilithiation, which can lead to poor cycle can performance in lithium-ion batteries. Additionally, instability of solid electrolyte interphase (SE) on Si particles caused by long term cycling can consume electrolyte to re-generate SEI and can significantly contribute to capacity fading.

Certain implementations described herein provide surface protective coatings on electrochemically active particles (such as silicon) which can improve the physiochemical stability of the particles (including microparticles) towards long term cycling. Cyclability can be improved by reducing and/or minimizing the mechanical stress induced by large volume changes and reducing and/or preventing reactions between the electrochemically active particles and the electrolyte.

Metal Oxide Coated Electrochemically Active Particles

Figure 1:
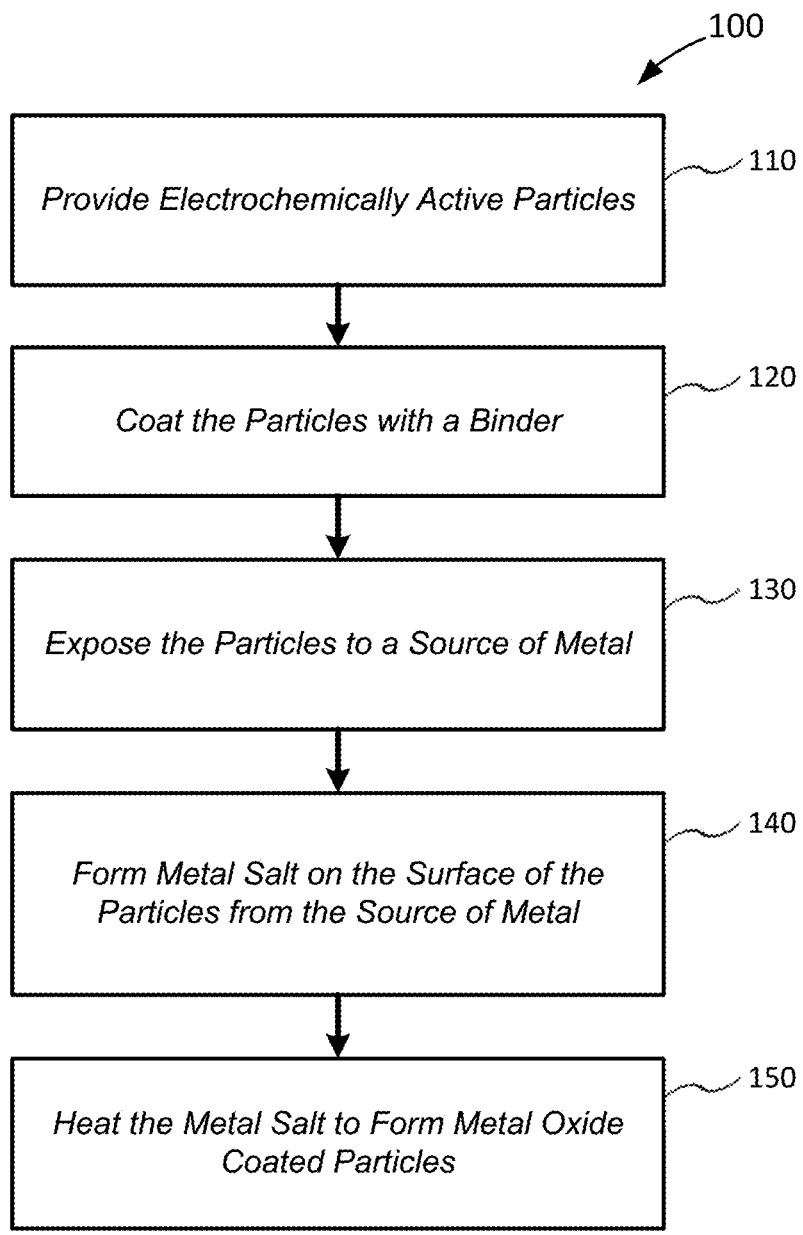
FIG. 1 is a flow diagram schematically illustrating an example method of preparing an electrochemically active material in accordance with certain implementations described herein.

Metal oxide coated electrochemically active particles can be advantageous when used in electrodes for batteries (e.g., Li-ion batteries) by introducing a protective layer over the electrochemically active particles. FIG. 1 is a flow diagram schematically illustrating an example method of preparing some such electrochemically active material. The method 100 of preparing an electrochemically active material can include providing electrochemically active particles as shown in block 110, coating the particles with a binder as shown in block 120, and exposing the particles to a source of metal as shown in block 130. The method 100 can also include forming metal salt on the surface of the particles from the source of metal as shown in block 140 and heating the metal salt to form metal oxide coated particles as shown in block 150.

Referring to block 110, electrochemically active particles can be provided. The electrochemically active particles can comprise at least one of silicon particles, germanium particles, and/or graphite particles. The particles may refer to particles, powders, fibers, etc. The particles can be at least partially crystalline, substantially crystalline, fully crystalline, or substantially polycrystalline. The particles may or may not be substantially pure silicon, germanium, and/or graphite. In some instances, the electrochemically active particles can include particles of an alloy metal. Alloy metals can include aluminum tin copper, Li based alloys (e.g., lithium titanate/tin), Sn—Co alloys, or combined alloys of Si—Sn—Ce—Fe—Al—Ti.

In various implementations, the electrochemically active material can include the electrochemically active particles at greater than about 0% to about 99% by weight. For example, the electrochemically active material can include from greater than 0% to about 99% by weight of the electrochemically active particles. For example, the amount of the electrochemically active particles by weight of the electrochemically active material can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, from about 10% to about 35% by weight, from about 10% to about 50% by weight, from about 10% to about 90% by weight, from about 10% to about 95% by weight, from about 10% to about 99% by weight, from about 30% to about 85% by weight, from about 30% to about 90% by weight, from about 30% to about 95% by weight, from about 30% to about 99% by weight, from about 50% to about 85% by weight, from about 50% to about 90% by weight, from about 50% to about 95% by weight, from about 50% to about 99% by weight, from about 60% to about 85% by weight, from about 60% to about 90% by weight, from about 60% to about 95% by weight, from about 60% to about 99% by weight, from about 70% to about 85% by weight, from about 70% to about 90% by weight, from about 70% to about 95% by weight, from about 70% to about 99% by weight, from about 80% to about 90% by weight, from about 80% to about 95% by weight, from about 80% to about 99% by weight, etc.).

In various implementations, electrochemically active particles can be microparticles. In some instances, the median particle size (D50) and/or the average particle size can be greater than about 1 µm. For example, the median and/or average particle size can be greater than about 1 µm to about 50 µm. The median and/or average particle size can be any size within this range (e.g., about 2 µm or greater, about 3 µm or greater, about 4 µm or greater, about 5 µm or greater, about 10 µm, about 15 µm, about 20 µm, about 25 µm, about 30 µm, about 35 µm, about 40 µm, about 45 µm, about 50 µm, etc.), or any range within this range such as any range formed by the example values (e.g., about 1 µm to about 10 µm, about 1 µm to about 20 µm, about 1 µm to about 30 µm, about 1 µm to about 40 µm, about 5 m to about 10 µm, about 5 m to about 20 m, about 5 µm to about 30 µm, about 5 µm to about 40 m, about 5 µm to about 50 µm, about 10 µm to about 20 µm, about 10 µm to about 30 µm, about 10 m to about 40 µm, about 10 µm to about 50 µm, about 15 µm to about 20 µm, about 15 µm to about 30 µm, about 15 µm to about 40 µm, about 15 µm to about 50 µm, about 20 µm to about 30 µm, about 20 µm to about 40 µm, about 20 µm to about 50 µm, etc.). In some implementations, the particles may have a distribution of particle sizes. For example, at least about 95%, at least about 90%, at least about 85%, at least about 80%, at least about 70%, or at least about 60% of the particles may have the particle size described herein.

Referring to block 120, the particles can be coated with a binder. The binder can help attach a metal oxide precursor to the surface of the particles. For example, the binder can create anchoring points to connect the precursor precipitates onto the particles. In some instances, the binder can create a negatively or positively charged surface, which can facilitate the coordination of metal with the electrochemically active particles. In various implementations, the binder can comprise a polymer having a molecular weight in the range of about 20,000 g/mol to about 40,000 g/mol. As an example, the polymer can have an ethylene backbone and/or copolymers or block copolymers. An example binder is polyvinylpyrrolidone (PVP),

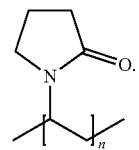

Other example binders can include:

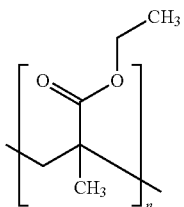
Poly(ethyl methacrylate),

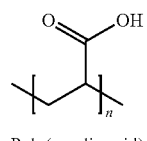
Poly(acrylic acid)

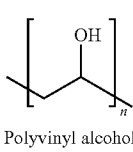
Polyvinyl alcohol

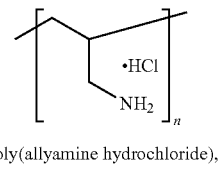
Poly(allyamine hydrochloride),

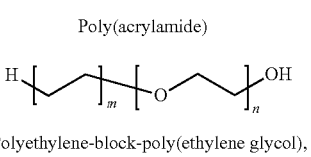
Poly(ethylene glycol) and derivatives

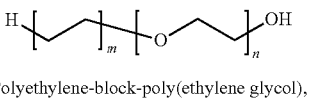
Poly(acrylamide)

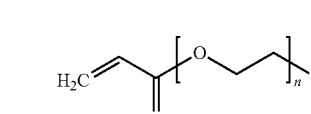
Poly(ethylene oxide)

Polyethylene-block-poly(ethylene glycol), Poly(propylene glycol)

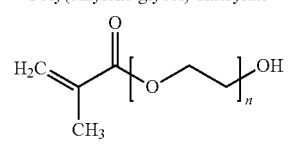
Poly(ethylene glycol) diacrylate

Poly(ethylene glycol) methacrylate,

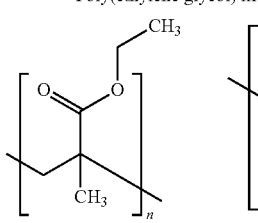
Poly(ethyl methacrylate),

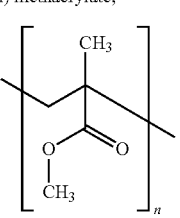
Poly(methyl methacrylate),

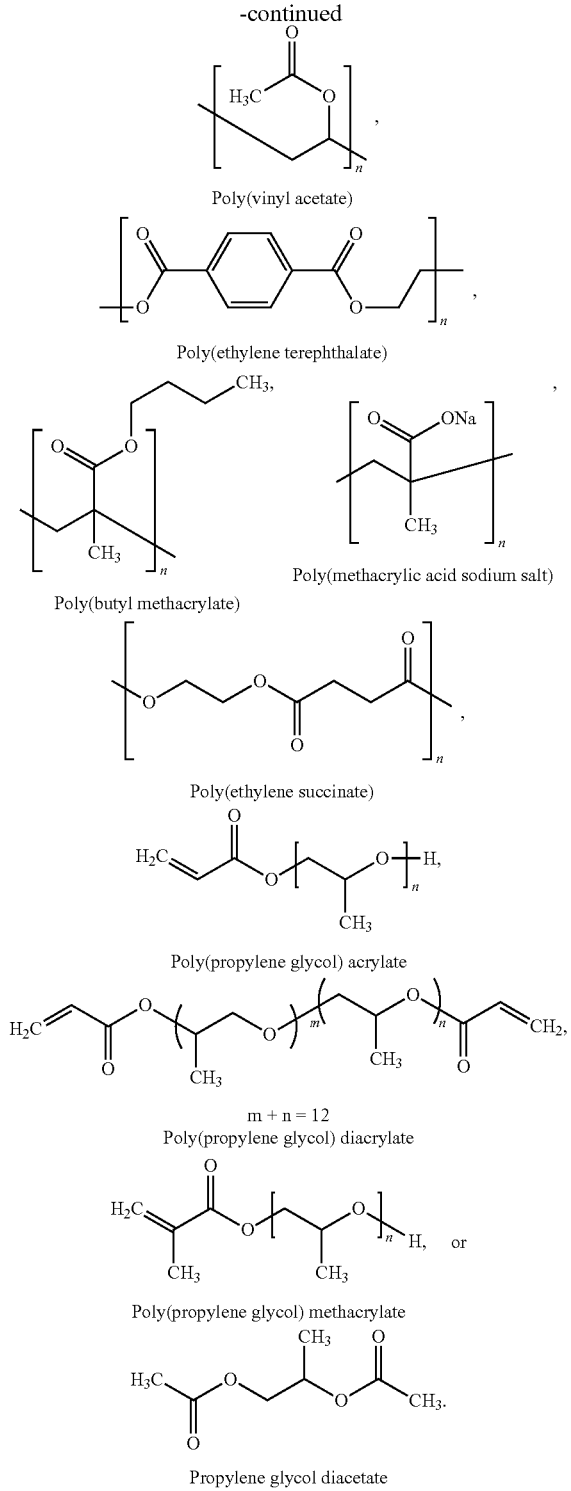

In some instances, the binder (e.g., polymeric component in solution) can comprise or act as a surfactant (emulsifier) to help stabilize the particle surface. In some instances, a surfactant can also lead to a more uniform coating by reducing aggregation of free particles. The surfactant can comprise a hydrophobic alkyl chain and/or hydrophilic center to create micelles around the electrochemically active particles. The surfactant can be anionic or cationic surfactants. In some implementations, the surfactant can comprise at least one of sodium dodecylsulfonate, sodium dodecylbenzenesulfonate, sodium dialkylsulfosuccinate, alkylbenzene sulfonates, alcohol ether sulfates, secondary alkane sulfonates, carboxymethylcellulose, and/or cetyltrimethylammonium bromide (CTAB). In some instances, hydrophilic comonomers such as (meth)acrylic acids, (meth)acrylamides, and/or hydroxyacrylates can be incorporated to stabilize the particle surface.

Referring to blocks 130, 140, and 150, the particles can be exposed to a source of metal. A metal salt (e.g., precursor) can be formed on the surface of the particles from the source of metal. In some instances, the particles can be exposed to urea prior to forming the metal salt on the surface of the particles. The molar ratio of urea to the electrochemically active particles can be in a range from about 50:1 to about 100:1 (e.g., about 60:1, about 70:1, about 80:1, about 90:1, etc.). In some instances, introduction of urea can include dissolving urea solid in about 50-200 mL of water (e.g., deionized water). In some instances, an aqueous solution of urea (e.g., about 100-500 mL) can be slowly added (e.g., <300 mL/min) to a mixture comprising the electrochemically active particles, binder, and water. In some instances, introduction of urea can occur about 10-30 minutes after introduction of the binder. The mixing range can be about 100-300 r.p.m. The presence of urea can support the sol-gel process to obtain a metal oxide precursor on the surface of the electrochemically active particles. In some instances, dilute ammonium hydroxide ($NH_4OH$) can be used instead of or in combination with urea. Precursors can be the corresponding salts of Al, Mo, Cu, Zn, Sn, Nb, Ru, Ir, Ti, and/or Zn. Example metal salts formed can comprise at least one of nitrates, nitrites, sulfates, sulfites, sulfonates, hydroxides, isopropoxides, oxyhydroxides, acetates, and/or carbonates.

Heating the metal salt can form metal oxide coated particles. In some instances, a mixed metal oxide can form. Example metal oxides can comprise at least one of $TiO_2$, $Al_2O_3$, $MoO_2$, $CuO$, $ZnO$, $SnO_2$, $Nb_2O_5$, $RuO_2$, $IrO_2$, and/or $TiNb_2O_7$. Another example metal oxide can include $Zn_xFe_yO_z$, where $1<x,y,z<4$. As another example, the metal oxide can include M-$Li_xO$, where M is a transition metal and $0.1 \leq x \leq 2$. Oxides can be formed via thermal oxidation of corresponding salts in both solid state and solvent based reactions. In some instances, the oxides can be formed by heating the solution at about 55-80° C. for about 14-16 hours. In some instances, the oxides can be formed by heating to about 400-500° C. (e.g., about 450° C.) at a ramp rate of about 2-10° C./min, and dwelling at the temperature for about 1-2 hours. Heating can occur in an inert atmosphere.

In some instances, the synthesis of M-$Li_xO$ can be conducted by incorporation of Li+ salts, such as LiOH, $LiNO_3$, or $Li_2CO_3$ during synthesis. In some instances, the composition of Li:M may be based at least in part on the stoichiometric ratio of Li:M salt. M-Li—OH or complexing Li and M (such as organometallic complexes of Li and M) with polymer coating may occur. Heat treatment of M-Li can convert some of M-O in metal oxides to M-$Li_xO$.

In various implementations, the electrochemically active particles can be surrounded (or substantially surrounded) by the metal oxide coating. The electrochemically active material can comprise the metal oxide at about 0.1% to about 10% by weight (e.g., about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9%, about 10%, etc.) or any range within this range such as any range formed by the example values (e.g., about 0.1% to about 5%, about 0.2% to about 5%, about 0.2% to about 10%, about 0.3% to about 5%, about 0.3% to about 10%, about 0.4% to about 5%, about 0.4% to about 10%, about 0.5% to about 5%, about 0.5% to about 10%, about 1% to about 5% by weight, about 1% to about 10%, etc.). In some instances, the metal oxide coating can include nanofeatures of about 1 nm to about 50 nm (e.g., about 1 nm, about 2 nm, about 3 nm, about 4 nm, about 5 nm, about 10 nm, about 15 nm, about 20 nm, about 25 nm, about 30 nm, about 35 nm, about 40 nm, about 45 nm, about 50 nm, etc.) or any range within this range such as any range formed by the example values (e.g., about 1 nm to about 10 nm, about 1 nm to about 20 nm, about 1 nm to about 30 nm, about 1 nm to about 40 nm, about 5 nm to about 10 nm, about 5 nm to about 20 nm, about 5 nm to about 30 nm, about 5 nm to about 40 nm, about 5 nm to about 50 nm, etc.). The metal oxide coating can have a thickness of about 1 nm to about 500 nm (e.g., about 1 nm, about 2 nm, about 3 nm, about 4 nm, about 5 nm, about 10 nm, about 15 nm, about 20 nm, about 25 nm, about 30 nm, about 35 nm, about 40 nm, about 50 nm, about 60 nm, about 70 nm, about 80 nm, about 90 nm, about 100 nm, about 150 nm, about 200 nm, about 250 nm, about 300 nm, about 350 nm, about 400 nm, about 450 nm, etc.) or any range within this range such as any range formed by the example values (e.g., about 2 nm to about 50 nm, about 2 nm to about 60 nm, about 2 nm to about 100 nm, about 5 nm to about 50 nm, about 5 nm to about 60 nm, about 5 nm to about 100 nm, about 10 nm to about 50 nm, about 10 nm to about 60 nm, about 10 nm to about 100 nm, about 20 nm to about 50 nm, about 20 nm to about 60 nm, about 20 nm to about 100 nm, etc.).

Figure 2:
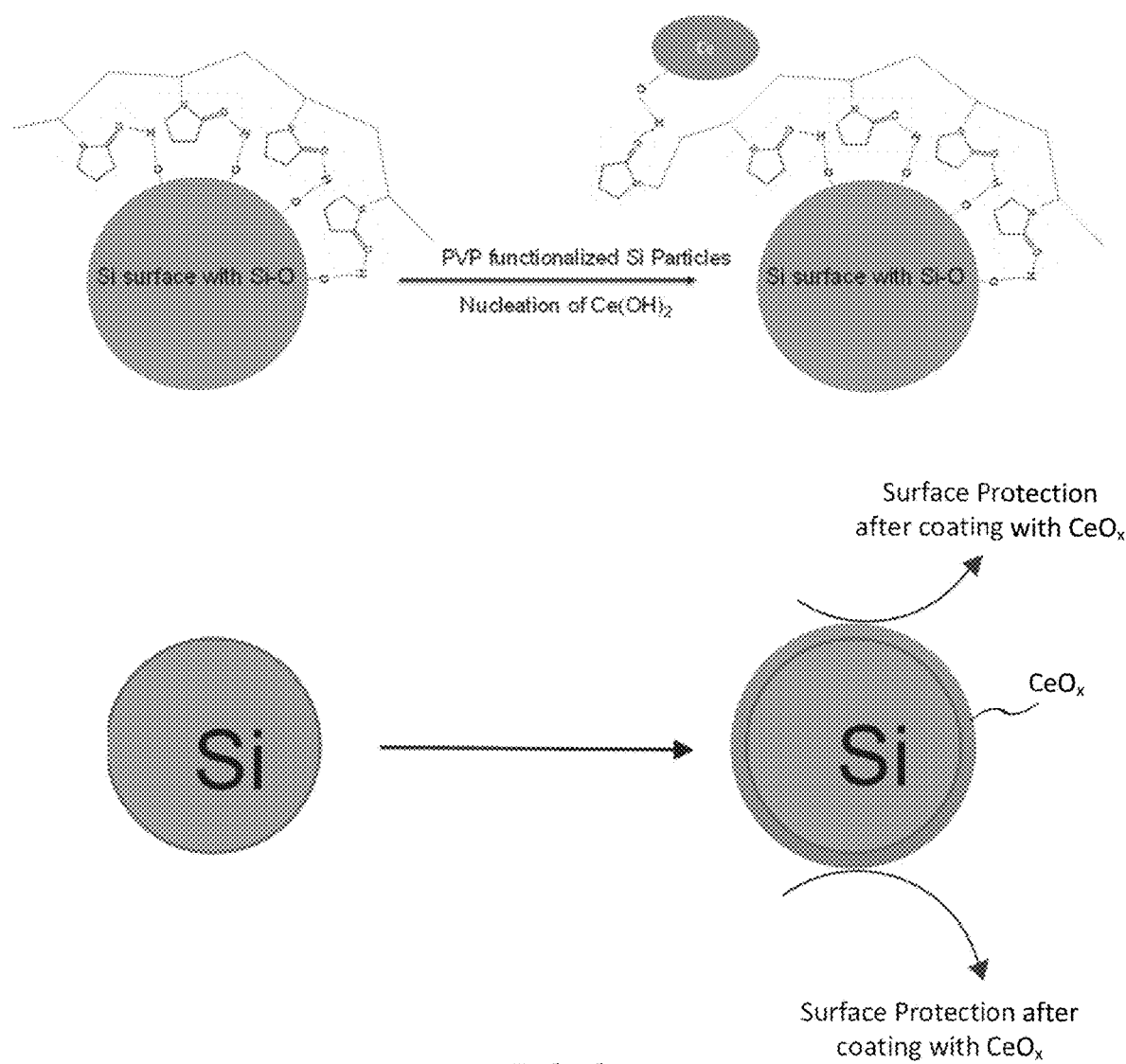
FIG. 2 schematically illustrates the formation of metal oxide coated electrochemically active particles and the illustration of surface protection of the particles from reactive species during cycling.

FIG. 2 schematically illustrates an example of coating particles with a binder, exposing the particles to a source of metal, forming a metal salt on the surface of the particles, and forming a metal oxide on the surface of the particles. In this example, the metal oxide comprises a cerium oxide or ceria coating layer (e.g., $CeO_x$, where $1 \leq x \leq 2$) on silicon particles. The coating layer can provide at least one of the following: (i) thickness (e.g., optimized in some instances) with good electrically conductivity; (ii) mechanical stability; (iii) high (e.g., excellent in some instances) ionic conductivity, and (iv) improved high temperature cell performance.

As shown in FIG. 2, a $CeO_2$ layer was formed via surface functionalization of Si particles using polyvinylpyrrolidone (PVP). For example, bulk Si microparticles were coated with PVP and ammonium cerium nitrate (($NH_4)_2Ce(NO_3)_6$) was used as the cerium source. The PVP particles acted as nucleation sites to form $Ce(OH)_2$ on the surface of the Si-particles in the presence of urea ($CO(NH_2)_2$). The presence of urea can support the sol-gel route to obtain a homogeneous solution of Ce—OH or carbonate precursor on the surface of Si particles. The hydrolysis reaction can generate ammonium carbonate and the pH can become about 9 to support the formation of a Ce precursor layer on the surface. Excess amounts of PVP in the aqueous media can act as a surfactant to reduce and/or prevent the aggregation of precursor particles that form inhomogeneous coatings and isolated large particles. Subsequent heat treatment converted the $Ce(OH)_2$ to a $CeO_2$ layer. Coating a $CeO_2$ shell on the outside of the Si material can preserve the electrode from irreversible reaction with the electrolyte, which can lead to the improvement of capacity retention. For example, the $CeO_2$ coating can provide surface protection of the Si particles from reactive species during cycling.

Other cerium sources can include at least one of cerium (IV) sulfate, cerium (III) nitrate hexahydrate, cerium (III) chloride heptahydrate, cerium trifluoromethanesulfonate, cerium (III) sulfate octahydrate, ammonium cerium (IV) sulfate dihydrate, cerium (III) sulfate, cerium (IV) sulfate tetrahydrate, cerium (III) acetate hydrate, and/or ammonium cerium (IV) nitrate. Another example cerium source can include a cerium-doped material. For example, the source of metal can comprise at least one of cerium (IV) oxide-yttria doped material, cerium-doped copper, cerium doped cobalt oxide, and/or cerium-doped indium oxide.

As described herein, various methods can prepare an electrochemically active material comprising $CeO_x$ coated on the silicon particles, where $1 \leq x \leq 2$. In some instances, the electrochemically active material can comprise greater than about 50% to about 99% by weight of silicon particles. For example, the electrochemically active material can comprise the silicon particles at about 60% to about 90% by weight, at about 60% to about 95% by weight, at about 60% to about 99% by weight, at about 70% to about 90% by weight, at about 70% to about 95% by weight, at about 70% to about 99% by weight, at about 75% to about 90%, at about 75% to about 95%, at about 75% to about 99% by weight, etc. In some instances, the silicon particles can have a median particle size (D50) and/or average particle size greater than about 1 μm to about 50 μm. In some instances, the D50 and/or the average particle size of the silicon particles can be greater than about 2 μm, greater than about 3 μm, greater than about 4 μm, greater than about 5 μm, etc. In various implementations, the silicon particles can be surrounded by the $CeO_x$ coating. The electrochemically active material can comprise the $CeO_x$ at about 0.1% to about 10% by weight (e.g., at about 1% to about 5% by weight, etc.). In some instances, the $CeO_x$ coating can include nanofeatures of about 1 nm to about 50 nm. In some instances, the $CeO_x$ coating can have a thickness of about 1 nm to about 500 nm (e.g., about 5 nm to about 60 nm, about 5 nm to about 100 nm, etc.).

In some instances, alloying reactions can be conducted using similar reaction methods and conditions to prepare an alloy material coating on the electrochemically active particles. Precursor materials for different components such as Cu—Al, Ag—Pt, Al—Ti, Ce—Ti, Ce—Al can be used during the synthesis.

Metal Oxide Additives in Electrochemically Active Material

Figure 3:
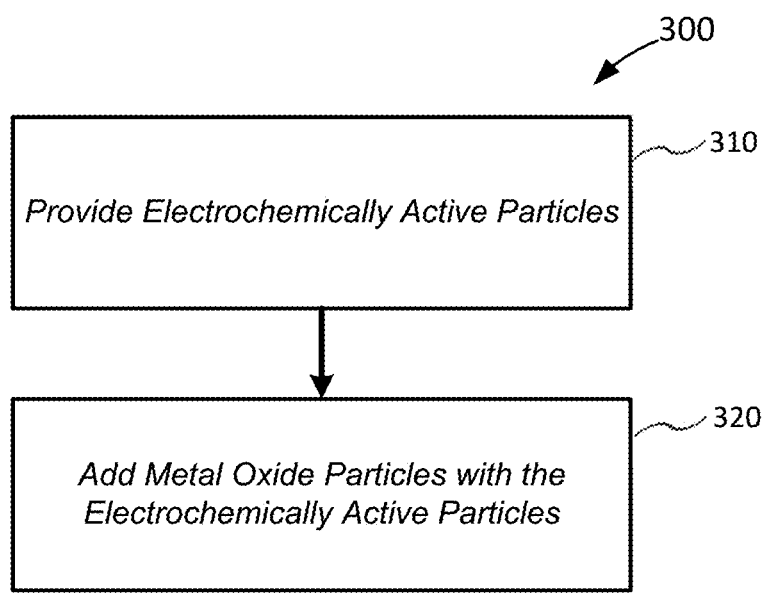
FIG. 3 is a flow diagram schematically illustrating an example method of preparing an electrochemically active material in accordance with certain implementations described herein

In some implementations, metal oxide particles can be used as an additive to attach to and/or coat the surfaces of electrochemically active particles. As an example, the metal oxide particles can be used as an additive with electrochemically active particles. FIG. 3 is a flow diagram schematically illustrating an example method of preparing some such electrochemically active material. The method 300 of preparing an electrochemically active material can include providing electrochemically active particles as shown in block 310. The electrochemically active particles can include any of those described herein (e.g., silicon particles, germanium particles, graphite particles, and/or particles of an alloy metal). As shown in block 320, the method 300 can also include adding metal oxide particles with the electrochemically active particles. The metal oxide can be any of those described herein. For example, $CeO_x$ particles, where $1 \leq x \leq 2$, can be added with the silicon particles. The silicon particles can include any of those described herein, e.g., metal oxide coated silicon particles and/or unmodified silicon particles. As described herein, the electrochemically active material can comprise the electrochemically active particles at greater than about 50% to about 99% by weight (e.g., about 60% to about 90% by weight, about 60% to about 95% by weight, about 60% to about 99% by weight, about 70% to about 90% by weight, about 70% to about 95% by weight, about 70% to about 99% by weight, about 75% to about 90%, about 75% to about 95%, about 75% to about 99% by weight, etc.). The electrochemically active particles can include microparticles. In some examples, the electrochemically active particles can have a median particle size (D50) and/or average particle size greater than about 1 μm to about 50 μm (e.g., greater than about 2 μm, greater than about 3 μm, greater than about 4 μm, greater than about 5 μm, etc.). The metal oxide particles can be nanoparticles or microparticles. In some instances, the metal oxide particles can have a median particle size (D50) and/or average particle size in the range of about 20 nm to about 2 μm (e.g., about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 1 μm, about 2 μm, etc.) or any range within this range such as any range formed by the example values (e.g., about 20 nm to about 50 nm, about 20 nm to about 1 μm, about 25 nm to about 50 nm, about 25 nm to about 1 μm, about 25 nm to about 2 μm, about 30 nm to about 50 nm, about 30 nm to about 1 μm, about 30 nm to about 2 μm, about 35 nm to about 50 nm, about 35 nm to about 1 μm, about 35 nm to about 2 μm, about 40 nm to about 1 μm, about 40 nm to about 2 μm, about 50 nm to about 1 μm, about 50 nm to about 2 μm, etc.).

Electrodes

In various implementations, the electrochemically active material (e.g., electrochemically active material comprising metal oxide coated particles and/or electrochemically active material comprising metal oxide as an additive) can be used to form an electrode, e.g., any electrode (anode or cathode) known in the art or yet to be developed. In some implementations, the electrochemically active material can be formed into a film-based electrode. For example, the electrochemically active material can be formed into composite films fabricated through using the electrochemically active material and carbonized polymer. For instance, the method can include mixing the electrochemically active material with a precursor (e.g., resin), and pyrolyzing the precursor to convert the precursor into one or more types of carbon phases to form a composite material film. The electrochemically active particles can be distributed in a matrix comprising the one or more carbon phases. For example, the metal oxide coated particles can be distributed in the matrix. As another example, metal oxide additives can be attached to the surface of the electrochemically active particles and embedded within the matrix. The one or more types of carbon phases can comprise at least one of hard carbon, soft carbon, and/or graphene. In some instances, the composite material film can be a self-supported composite structure and/or can be attached to a current collector. In some implementations, the electrochemically active material can be formed into electrodes comprising the particles coated on a current collector with a binder.

Some example electrodes will now be described.

Film-Based Electrodes

As described herein, certain implementations include electrodes that may include a composite material film with the electrochemically active particles dispersed in the matrix. The electrochemically active particles can include silicon, germanium, graphite, etc. Electrodes using silicon particles will be described, but can apply to other types of electrochemically active particles.

In various implementations, the electrodes (e.g., anodes and cathodes) may include carbonized polymer and silicon material (e.g., silicon particles coated with metal oxide and/or silicon particles combined with metal oxide as an additive). For example, a mixture that includes a carbon precursor including silicon material can be formed into a composite material. This mixture can include both carbon and silicon and thus can be referred to as a carbon-silicon composite material, a silicon-carbon composite material, a carbon composite material, or a silicon composite material.

Typical carbon anode electrodes include a current collector such as a copper sheet. Carbon is deposited onto the collector along with an inactive binder material. Carbon is often used because it has excellent electrochemical properties and is also electrically conductive. Anode electrodes used in the rechargeable lithium-ion cells typically have a specific capacity of approximately 200 milliamp hours per gram (including the metal foil current collector, conductive additives, and binder material). Graphite, the active material used in most lithium-ion battery anodes, has a theoretical energy density of 372 milliamp hours per gram (mAh/g). In comparison, silicon has a high theoretical capacity of 4200 mAh/g. Silicon, however, swells in excess of 300% upon lithiation. Because of this expansion, anodes including silicon may expand/contract and lose electrical contact to the rest of the anode. Therefore, a silicon anode should be designed to be able to expand while maintaining good electrical contact with the rest of the electrode.

U.S. patent application Ser. No. 13/008,800, (Now U.S. Pat. No. 9,178,208), U.S. patent application Ser. No. 13/601,976, and U.S. patent application Ser. No. 13/799,405, (Now U.S. Pat. No. 9,553,303), each of which are incorporated by reference herein, describe certain implementations of carbon-silicon composite materials using carbonized polymer and silicon material. The carbonized polymer can act as an expansion buffer for silicon particles during cycling so that a high cycle life can be achieved. In certain implementations, the resulting electrode can be an electrode that is comprised substantially of active material. For example, the carbonized polymer can form a substantially continuous conductive carbon phase(s) in the entire electrode as opposed to particulate carbon suspended in a non-conductive binder in one class of conventional lithium-ion battery electrodes. Because the polymer can be converted into an electrically conductive and electrochemically active matrix, the resulting electrode can be conductive enough that a metal foil or mesh current collector may be omitted, minimized, or reduced in some implementations. Accordingly, in U.S. patent application Ser. No. 13/008,800, (Now U.S. Pat. No. 9,178,208), application Ser. No. 13/601,976, and U.S. patent application Ser. No. 13/799,405, (Now U.S. Pat. No. 9,553,303), certain implementations of monolithic, self-supported electrodes are disclosed. The electrodes can have a high energy density of between about 500 mAh/g to about 3500 mAh/g that can be due to, for example, 1) the use of silicon, 2) elimination or substantial reduction of metal current collectors, and 3) being comprised entirely or substantially entirely of active material.

The carbon-silicon composite material can be formed by forming a mixture including a precursor, and pyrolyzing the precursor to convert the precursor to a carbon phase. In certain implementations, the carbon precursor is a hydrocarbon compound. For example, the precursor can include polyamideimide (PAI), polyamic acid, polyimide (PI), etc. Other precursors include phenolic resins, epoxy resins, and other polymers. The mixture can further include a solvent. For example, the solvent can be N-methyl-pyrollidone (NMP). Other possible solvents include acetone, diethyl ether, gamma butyrolactone, isopropanol, dimethyl carbonate, ethyl carbonate, dimethoxyethane, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain implementations, the amount of precursor (e.g., solid polymer) in the solvent is about 10 wt. % to about 30 wt. %.

The mixture can include silicon particles as described herein. The mixture may comprise greater than about 0% to about 99% by weight of the precursor, and greater than 0% to about 99% by weight of the silicon particles. Additional materials can also be included in the mixture. As an example, carbon particles including graphite active material, chopped or milled carbon fiber, carbon nanofibers, carbon nanotubes, and other conductive carbons can be added to the mixture. Conductive particles can also be added to the mixture. In addition, the mixture can be mixed to homogenize the mixture.

In certain implementations, the mixture is cast on a substrate. In some implementations, casting includes using a gap extrusion, tape casting, or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent. For example, a polyamic acid and NMP solution can be dried at about 110° C. for about 2 hours to remove the NMP solution. The dried mixture can then be removed from the substrate. For example, an aluminum substrate can be etched away with HC. Alternatively, the dried mixture can be removed from the substrate by peeling or otherwise mechanically removing the dried mixture from the substrate. In some implementations, the substrate comprises polyethylene terephthalate (PET), including for example Mylar®. In certain implementations, the dried mixture is a film or sheet. In some implementations, the dried mixture is optionally cured. In some implementations, the dried mixture may be further dried. For example, the dried mixture can placed in a hot press (e.g., between graphite plates in an oven). A hot press can be used to further dry and/or cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In certain implementations, tape casting techniques can be used for the casting. In some implementations, the mixture can be coated on a substrate by a slot die coating process (e.g., metering a constant or substantially constant weight and/or volume through a set or substantially set gap). In some other implementations, there is no substrate for casting and the anode film does not need to be removed from any substrate. The dried mixture may be cut or mechanically sectioned into smaller pieces.

The mixture further goes through pyrolysis to convert the polymer precursor to carbon. In certain implementations, the mixture is pyrolyzed in a reducing atmosphere. For example, an inert atmosphere, a vacuum and/or flowing argon, nitrogen, or helium gas can be used. In some implementations, the mixture is heated to about 900° C. to about 1350° C. For example, polyimide formed from polyamic acid can be carbonized at about 1175° C. for about one hour. In certain implementations, the heat up rate and/or cool down rate of the mixture is about 10° C./min. A holder may be used to keep the mixture in a particular geometry. The holder can be graphite, metal, etc. In certain implementations, the mixture is held flat. After the mixture is pyrolyzed, tabs can be attached to the pyrolyzed material to form electrical contacts. For example, nickel, copper or alloys thereof can be used for the tabs.

In certain implementations, one or more of the methods described herein can be carried out in a continuous process. In certain implementations, casting, drying, possibly curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor forms a pyrolytic carbon and results in one or more type of carbon phases. The term "pyrolytic carbon" refers to carbon formed by pyrolysis. Pyrolytic carbon may comprise hard and/or soft carbon, but does not include graphite. In some implementations, the precursor is any material that can be pyrolyzed to form a pyrolytic carbon. When the mixture includes one or more additional materials or phases in addition to the carbonized precursor, a composite material can be created. In particular, the mixture can include silicon particles, creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material.

Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon losses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can reduce the chance that electrical contact to the surface of the silicon is lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

As described herein, in order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, are viable candidates as active materials for the negative or positive electrode. As described herein, the amount of silicon provided in the mixture or in the composite material can be within a range from greater than about 0% to about 99% by weight of the composite material.

For example, the electrochemically active material can include from greater than 0% to about 99% by weight of silicon. For example, the amount of silicon by weight of the electrochemically active material can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, from about 10% to about 35% by weight, from about 10% to about 50% by weight, from about 10% to about 90% by weight, from about 10% to about 95% by weight, from about 10% to about 99% by weight, from about 30% to about 85% by weight, from about 30% to about 90% by weight, from about 30% to about 95% by weight, from about 30% to about 99% by weight, from about 50% to about 85% by weight, from about 50% to about 90% by weight, from about 50% to about 95% by weight, from about 50% to about 99% by weight, from about 60% to about 85% by weight, from about 60% to about 90% by weight, from about 60% to about 95% by weight, from about 60% to about 99% by weight, from about 70% to about 85% by weight, from about 70% to about 90% by weight, from about 70% to about 95% by weight, from about 70% to about 99% by weight, from about 80% to about 90% by weight, from about 80% to about 95% by weight, from about 80% to about 99% by weight, etc.).

In some such instances, the electrode can include a silicon-dominant electrode. For example, the electrode can include silicon-dominant electrochemically active material. As an example, the electrochemically active material can include at least about 50% to about 95% by weight of silicon, at least about 50% to about 99% by weight of silicon, at least about 60% to about 95% by weight of silicon, at least about 60% to about 99% by weight of silicon, at least about 70% to about 95% by weight of silicon, at least about 70% to about 99% by weight of silicon, at least about 80% to about 95% by weight of silicon, at least about 80% to about 99% by weight of silicon, etc. In some examples, the electrochemically active material can include 99% by weight of silicon.

As described herein, In some implementations, all, substantially all, or at least some of the silicon particles may have a particle size (e.g., the diameter or the largest dimension of the particle) between about 10 nm and about 50 µm. In some implementations, the average particle size (or the average diameter or the average largest dimension) or the median particle size (or the median diameter or the median largest dimension) of the silicon particles can be between about 10 nm and about 50 µm. In some implementations, the silicon particles may have a distribution of particle sizes. For example, at least about 95%, at least about 90%, at least about 85%, at least about 80%, at least about 70%, or at least about 60% of the particles may have the particle size described herein.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

The amount of carbon obtained from the precursor can be greater than 0% to about 80% by weight such as about 1% to about 80% by weight, about 1% to about 70% by weight, about 1% to about 60% by weight, about 1% to about 50% by weight, about 1% to about 40% by weight, about 1% to about 30% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. For example, the amount of carbon obtained from the precursor can be about 1%, about 5%, about 10% by weight, about 15% by weight, about 20% by weight, about 25% by weight, etc. from the precursor. The carbon is obtained through heating a carbon-containing precursor at a temperature sufficient for pyrolysis of the precursor to occur, and is thus pyrolytic carbon.

The carbon from the precursor can be hard and/or soft carbon. Hard carbon can be a carbon that does not convert into graphite even with heating in excess of 2800 degrees Celsius. Precursors that melt or flow during pyrolysis convert into soft carbons with sufficient temperature and/or pressure. In some instances, upon further heat treatment, (e.g., between 2000° C.-3000° C.) precursors may form graphite. Hard carbon may be selected in some implementations since soft carbon precursors may flow and soft carbons and graphite are mechanically weaker than hard carbons. Possible pyrolytic carbon precursors can include polyimide (or a polyimide precursor), other aromatic polyimides, phenolic resins, epoxy resins, poly(p-phenylene vinylene) (PPV), poly(p-phenylene-1,3,4-oxadiazole) (POD), benzimidazobenzophenanthroline ladder (BBL) polymer, and other polymers that have a very high melting point or are crosslinked. The amount of pyrolytic carbon (e.g., hard carbon and/or soft carbon, but not graphite) in the composite material can be any of the ranges described herein with respect to the amount of carbon obtained from the precursor. In certain implementations, the pyrolytic carbon phase is substantially amorphous. In other implementations, the pyrolytic carbon phase is substantially crystalline. In further implementations, the pyrolytic carbon phase includes amorphous and crystalline carbon. The pyrolytic carbon phase can be a matrix phase in the composite material. The pyrolytic carbon can also be embedded in the pores of the additives including silicon. The pyrolytic carbon may react with some of the additives to create some materials at interfaces. For example, there may be a layer of silicon carbide and/or silicon carbide containing oxygen (Si—C—O) between silicon particles and the pyrolytic carbon. In some instances, a metal oxycarbide may form between the silicon particles and the pyrolytic carbon.

In some implementations, upon further heat treatment, graphite is one of the types of carbon phases from the precursor. In certain implementations, graphite particles are added to the mixture. Graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer (in certain directions) than pyrolytic carbon and can better absorb the volume expansion of silicon additives. In certain implementations, all, substantially all, or at least some of the graphite particles may have a particle size (e.g., a diameter or a largest dimension) between about 0.5 microns and about 20 microns. In some implementations, an average particle size (e.g., an average diameter or an average largest dimension) or median particle size (e.g., a median diameter or a median largest dimension) of the graphite particles is between about 0.5 microns and about 20 microns. In some implementations, the graphite particles may have a distribution of particle sizes. For example, at least about 95%, at least about 90%, at least about 85%, at least about 80%, at least about 70%, or at least about 60% of the particles may have the particle size described herein. In certain implementations, the composite material can include graphite particles in an amount greater than 0% and less than about 80% by weight, including from 40% to about 75% by weight, from about 5% to about 30% by weight, from 5% to about 25% by weight, from 5% to about 20% by weight, or from 5% to about 15% by weight.

In certain implementations, conductive particles which may also be electrochemically active are added to the mixture. Such particles can enable both a more electronically conductive composite as well as a more mechanically deformable composite capable of absorbing the large volumetric change incurred during lithiation and de-lithiation. In certain implementations, all, substantially all, or at least some of the conductive particles can have a particle size (e.g., the diameter or the largest dimension) between about 10 nanometers and about 7 micrometers. In some implementations, an average particle size (e.g., an average diameter or an average largest dimension) or a median particle size (e.g., a median diameter or a median largest dimension) of the conductive particles is between about 10 nm and about 7 micrometers. In some implementations, the conductive particles may have a distribution of particle sizes. For example, at least about 95%, at least about 90%, at least about 85%, at least about 80%, at least about 70%, or at least about 60% of the particles may have the particle size described herein.

In certain implementations, the mixture includes conductive particles in an amount greater than zero and up to about 80% by weight. In some implementations, the composite material includes about 45% to about 80% by weight. The conductive particles can be conductive carbon including carbon blacks, carbon fibers, carbon nanofibers, carbon nanotubes, etc. Many carbons that are considered as conductive additives that are not electrochemically active become active once pyrolyzed in a polymer matrix. Alternatively, the conductive particles can be metals or alloys including copper, nickel, or stainless steel.

After the precursor is pyrolyzed, the resulting carbon material can be a self-supporting monolithic structure. The carbonized precursor results in an electrochemically active structure that holds the composite material together. For example, the carbonized precursor can be a substantially continuous phase. Advantageously, the carbonized precursor can be a structural material as well as an electro-chemically active and electrically conductive material. In certain implementations, material particles added to the mixture are homogenously or substantially homogeneously distributed throughout the composite material to form a homogeneous or substantially homogeneous composite.

In some implementations, the composite material and/or electrode does not include a polymer beyond trace amounts that remain after pyrolysis of the precursor. In further implementations, the composite material and/or electrode does not include a non-electrically conductive binder. The composite material may also include porosity. In some implementations, the composite material (or the film) can include porosity of about 1% to about 70% or about 5% to about 50% by volume porosity. For example, the porosity can be about 5% to about 40% by volume porosity.

A current collector may be preferred in some applications, for example, where current above a certain threshold or additional mechanical support may be desired. In some instances, the current collector can include copper, nickel, stainless steel, aluminum, etc. U.S. patent application Ser. No. 13/333,864, filed Dec. 21, 2011, and published on Jun. 19, 2014 as U.S. Patent Application Publication No. 2014/0170482, now U.S. Pat. No. 9,397,338, entitled "Electrodes, Electrochemical Cells, and Methods of Forming Electrodes and Electrochemical Cells," U.S. patent application Ser. No. 13/796,922, filed Mar. 12, 2013, and published on Jun. 19, 2014 as U.S. Patent Application Publication No. 2014/0170475, now U.S. Pat. No. 9,583,757, entitled "Electrodes, Electrochemical Cells, and Methods of Forming Electrodes and Electrochemical Cells," and U.S. patent application Ser. No. 15/471,860, filed Mar. 28, 2017, and published on Oct. 4, 2018 as U.S. Patent Application Publication No. 2018/0287129, entitled "Methods of Forming Carbon-Silicon Composite Material on a Current Collector," each of which is incorporated by reference herein, describe certain implementations of electrodes including a current collector, electrochemical cells comprising such electrodes, and methods of forming such electrodes and electrochemical cells.

Slurry-Based Electrodes

In some implementations, the electrode can include the prepared electrochemically active particles (e.g., electrochemically active material comprising metal oxide coated particles and/or metal oxide as an additive) coated on a current collector (e.g., a Cu foil, Ni foil, Al foil, etc.). For example, the prepared electrochemically active material (e.g., particles) can be coated on a current collector with a binder. For instance, the material can be added to a slurry and coated on a current collector. Additional conductive particles (e.g., Super P, graphene, graphite, carbon nanofibers, carbon nanotubes, and/or other carbon) can also be added to the slurry. The slurry can contain a solvent and/or binder. The solvent can be dried to form the electrode. In some instances, a binder can be applied separately.

The prepared electrochemically active material can include from greater than 0% to about 100% by weight of the total electrochemically active material of the electrode. For example, the prepared electrochemically active material can include from greater than 0% to about 100% by weight of the total electrochemically active material of the electrode. For example, the amount of prepared material by weight of the total electrochemically active material can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, about 100%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, greater than about 0% to about 99% by weight, from about 10% to about 35% by weight, from about 10% to about 50% by weight, from about 10% to about 90% by weight, from about 10% to about 95% by weight, from about 10% to about 99% by weight, from about 10% to about 100% by weight, from about 30% to about 85% by weight, from about 30% to about 90% by weight, from about 30% to about 95% by weight, from about 30% to about 99% by weight, from about 30% to about 100% by weight, from about 50% to about 85% by weight, from about 50% to about 90% by weight, from about 50% to about 95% by weight, from about 50% to about 99% by weight, from about 50% to about 100% by weight, from about 60% to about 85% by weight, from about 60% to about 90% by weight, from about 60% to about 95% by weight, from about 60% to about 99% by weight, from about 60% to about 100% by weight, from about 70% to about 85% by weight, from about 70% to about 90% by weight, from about 70% to about 95% by weight, from about 70% to about 99% by weight, from about 70% to about 100% by weight, from about 80% to about 90% by weight, from about 80% to about 95% by weight, from about 80% to about 99% by weight, from about 80% to about 100% by weight, etc.).

As an example, the prepared electrochemically active material can include silicon particles. In some such instances, the electrode can include a silicon-dominant electrode. For example, the electrode can include silicon-dominant electrochemically active material. As an example, the electrochemically active material can include at least about 50% to about 95% by weight of silicon, at least about 50% to about 99% by weight of silicon, at least about 50% to about 100% by weight of silicon, at least about 60% to about 95% by weight of silicon, at least about 60% to about 99% by weight of silicon, at least about 60% to about 100% by weight of silicon, at least about 70% to about 95% by weight of silicon, at least about 70% to about 99% by weight of silicon, at least about 70% to about 100% by weight of silicon, at least about 80% to about 95% by weight of silicon, at least about 80% to about 99% by weight of silicon, at least about 80% to about 100% by weight of silicon.

Metal Oxide Coated Electrodes

Similar to the methods described with respect to coating electrochemically active particles, an electrode can be coated with metal oxide. For example, the electrode can be coated with a binder and exposed to a source of metal. A metal salt can be formed on the surface of the electrode, and the metal salt can be heated to form a metal oxide coated electrode.

The provided electrode can be any electrode known in the art or yet to be developed. For example, the electrode can be any electrode described herein. As an example, the electrode can comprise electrochemically active particles coated on a current collector. As another example, the electrode can be a composite film. In some instances, the electrode is a silicon-containing electrode. For example, the electrode can include silicon particles coated on a current collector with a binder. As another example, the electrode can be a silicon-carbon composite film. In some instances, the electrode is a silicon-dominant electrode (e.g., comprising silicon-dominant electrochemically active material).

Electrochemical Cells

In some implementations, the electrodes described herein can be used in any electrochemical device known in the art or yet to be developed. Cell configurations include but are not limited to pouch, prismatic, coin cell type, cylindrical, etc. As an example, the electrochemical device can be a battery, e.g., a lithium ion battery. In some implementations, the battery is a secondary battery, or in other implementations, the battery is a primary battery. The electrochemical device can include a first electrode, a second electrode, and an electrolyte. The first electrode can be any electrode described herein.

In some implementations, the electrode can be a film-based electrode described herein. In some implementations, the electrode can include electrochemically active particles coated on a current collector (e.g., with a binder). The current collector can be any known in the art or yet to be developed. In some instances, the current collector can comprise copper, nickel, stainless steel, aluminum, etc. The current collector can be a foil or a mesh.

The first electrode can comprise an anode. The second electrode can comprise a cathode. For example, the cathode can comprise Lithium-Cobalt-Oxide ($LiCoO_2$) (LCO). As another example, the cathode can comprise Lithium-Manganese-Oxide ($LiMnO_2$) (LMO). As other examples, the cathode can be a layered Lithium Nickel-Cobalt-Manganese oxide (NCM) or Lithium Nickel-Cobalt-Aluminum oxide (NCA) cathode. In some embodiments, the cathode can include a lithium rich oxide, a nickel-rich oxide, a high-voltage cathode material, a lithium rich layered oxide, a nickel-rich layered oxide, a high-voltage spinel oxide, and/or a high-voltage polyanionic compound. Lithium rich oxides may include $xLi_2MnO_3 \cdot (1-x)LiNi_aCo_bMnO_2$, where $0<x<1$, $a+b+c=1$. Nickel rich oxides may include $LiNi_xCo_yMn_zO_2$, where $0:5$ x, y, $z<1$ and $x+y+z=1$ (NCM), or $Li[Ni_xCo_yAl_{1-x-y}]O_2$, where $0 \leq x$, y, $z<1$ and $x+y+z=1$ (NCA). Nickel-rich layered oxides may include $LiNi_{1-x}MxO_2$, where M comprises Co, Mn, or Al). Lithium rich layered oxides may include $LiNi_{1+x}M_{1-x}O_2$, where M comprises Co, Mn, or Ni). High-voltage spinel oxides may include $LiNi_{0.5}Mn_{1.5}O_4$. High-voltage polyanionic compounds may include phosphates, sulfates, silicates, etc. In some instances, high-voltage may refer to at least 4.7V, 5V, etc. In some instances, the cathode can comprise carbon black (e.g., Super P). In some implementations, the cathode can comprise a binder (e.g., PVDF, CMC, SBR, Sodium Alginate, PAI, PAA, Li-PAA, PI, and mixtures and combinations thereof). In some embodiments, the cathode can comprise a current collector (e.g., Al foil). As an example, the cathode active material can be mixed with carbon black and binder to prepare a slurry. The slurry can be coated on the surface of the current collector. The solvent can be dried from the coated current collector to form a cathode. In some embodiments, the cathode can be a film-based electrode. Other examples are possible.

In some embodiments, the electrochemical device can comprise any electrolyte known in the art or yet to be developed. The electrolyte can include liquid, gel polymer, or solid state electrolytes. The electrolytes may be composed of cyclic carbonates, linear carbonates, and/or Li salts with or without additives. The cyclic carbonates can be fluoroethylene carbonate (FEC), di-fluoroethylene carbonate (DiFEC), Trifluoropropylene carbonate (TFPC), ethylene carbonate (EC), ethyl methyl carbonate (EMC), methyl acetate, and/or propylene carbonate (PC). The linear carbonates can be dimethyl carbonate (DMC), diethyl carbonate (DEC), gamma butyrolactone, Dimethoxyethane (DME), Dioxolane (DOL), 1,1,2,2-Tetrafluoroethyl 2,2,3,3-Tetrafluoropropyl Ether, other carbonate solvents (linear, cyclic or acyclic ones), ether solvents, etc. The Li salt can be hexafluorophosphate ($LiPF_6$), lithium tetrafluoroborate ($LiBF_4$), lithium hexafluoroarsenate monohydrate ($LiAsF_6$), lithium bis(trifluoromethanesulfonyl)imide (LiTFSI), lithium bis(fluorosulfonyl)imide (LiFSI), lithium difluoro (oxalate)borate (LiDFOB), lithium bis(oxalato)borate (LiBOB), lithium triflate ($LiCF_3SO_3$), lithium tetrafluorooxalato phosphate (LTFOP), lithium pentafluoroethyltrifluoroborate (LiFAB), lithium 2-trifluoromethyl-4,5-dicyanoimidazole (LiTDI), lithium bis(2-fluoromalonato)borate (LiBFMB), lithium 4-pyridyl trimethyl borate (LPTB) and lithium 2-fluorophenol trimethyl borate (LFPTB), lithium catechol dimethyl borate (LiCDMB), lithium tetrafluorooxalatophosphate (LiFOP), lithium perchlorate ($LiClO_4$), lithium difluorophosphate ($LiPO_2F_2$), or a combination thereof.

EXAMPLES

Example Metal Oxide Coated Particles

As described with respect to FIG. 2, bulk Si microparticles were coated with PVP in the presence of urea and ammonium cerium nitrate (($NH_4)_2Ce(NO_3)_6$) was used as the cerium source. The PVP helped the Ce—OH attach onto the surface of the Si. Subsequent heat treatment converted the $Ce(OH)_2$ to a $CeO_2$ layer.

Figures 4A, 4B:
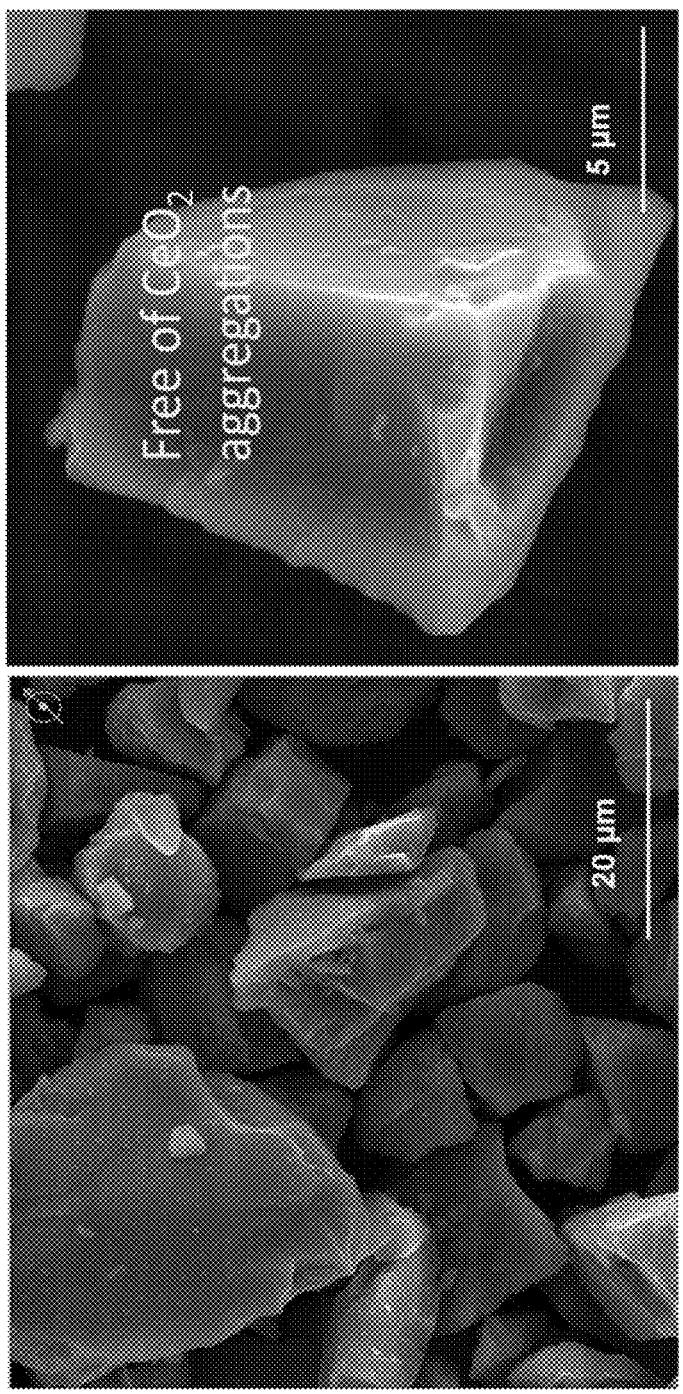
FIGS. 4A and 4B are scanning electron microscopy (SEM) images showing the surface on certain coated electrochemically active particles.
Figures 5A, 5B, 5C, 5D:
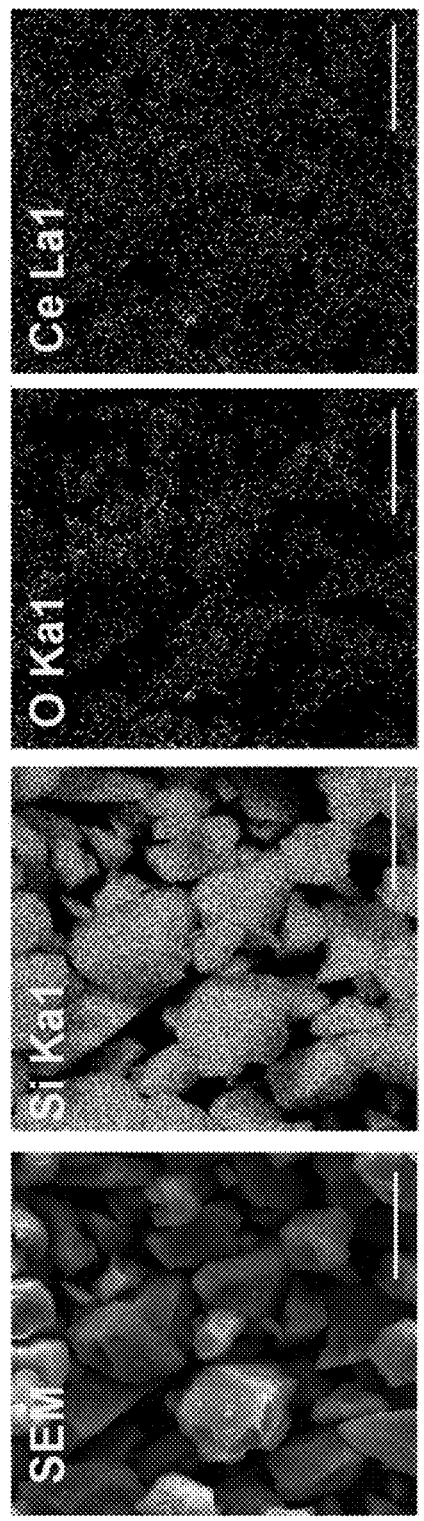
FIGS. 5A, 5B, 5C, and 5D are energy dispersive x-ray spectroscopy (EDS) mappings of Ce on the surface of Si particles.

The presence of the $CeO_2$ coating on Si particles was shown using scanning electron microscopy (SEM), energy dispersive x-ray spectroscopy (EDS), and transmission electron microscopy (TEM) analysis. FIGS. 4A and 4B are SEM images showing a smooth surface on Si particles without aggregation of unreacted species or excess $CeO_2$. In various implementations, the initial surface modification of bulk Si particles with PVP can hinder the aggregation of free formed $CeO_2$ particles. This can allow for a conformal coating in various instances, which can be important for electrochemistry as none or very little of the silicon is exposed on the surface and can differentiate this approach from other potential approaches using $CeO_2$ particles. For example, PVP can act as a surfactant to minimize isolated surplus reactions of forming $CeO_2$ aggregations. FIGS. 5A-5D are EDS mappings of Ce on the surface of Si particles showing the uniform distribution of $CeO_2$.

In various implementations, the synthesis of a cerium oxide layer can be controlled using the methodologies described herein. For example, control of the percentages of the materials (e.g., precursors) and compositions can facilitate the formation of the cerium oxide layer with different thicknesses and compositions. Example $CeO_2$ coatings were developed using different precursor compositions. EDS analysis was conducted at different areas to identify the composition of Ce spread throughout the surface of the Si particles. Table 1 shows the average Ce composition of Si particles for samples Si—$CeO_2$ Coated-1 and Si—$CeO_2$ Coated-2.

TABLE 1

| | Si—CeO2 Coated-1 | | | Si—CeO2 Coated-2 | |
|---|---|---|---|---|---|
| Sampling (Thin Coating) | Ce 1. Weight % | Atomic % | Sampling (Thck Coating) | Ce 1. Weight % | Atomic % |
| 1 | 1.44 | 0.23 | 1 | 3.07 | 0.44 |
| 2 | 1.39 | 0.22 | 2 | 3.09 | 0.46 |
| 3 | 1.43 | 0.22 | 3 | 3.25 | 0.49 |
| 4 | 1.35 | 0.21 | 4 | 3.00 | 0.47 |
| 5 | 1.33 | 0.22 | 5 | 3.37 | 0.52 |
| Average | 1.39 ± 0.04 | 0.22 ± 0.01 | Average | 3.17 ± 0.12 | 0.48 ± 0.03 |

The SEM images and EDS analysis confirmed the presence of $CeO_2$ on the surface of Si microparticles. TEM analysis was conducted on smaller-sized particles (nanometer range) in order to see the cross-sectional morphology and $CeO_2$ distribution on the surface. Several locations of the powder samples were selected and bright field TEM imaging and EDS were conducted. FIGS. 6A-6C are the TEM image and corresponding EDS mapping of Ce on the surface of the Si particles. The bar scale represents 250 nm. The surfaces of the Si particles were coated with a thin layer and uniform distribution of $CeO_2$.

Figure 7:
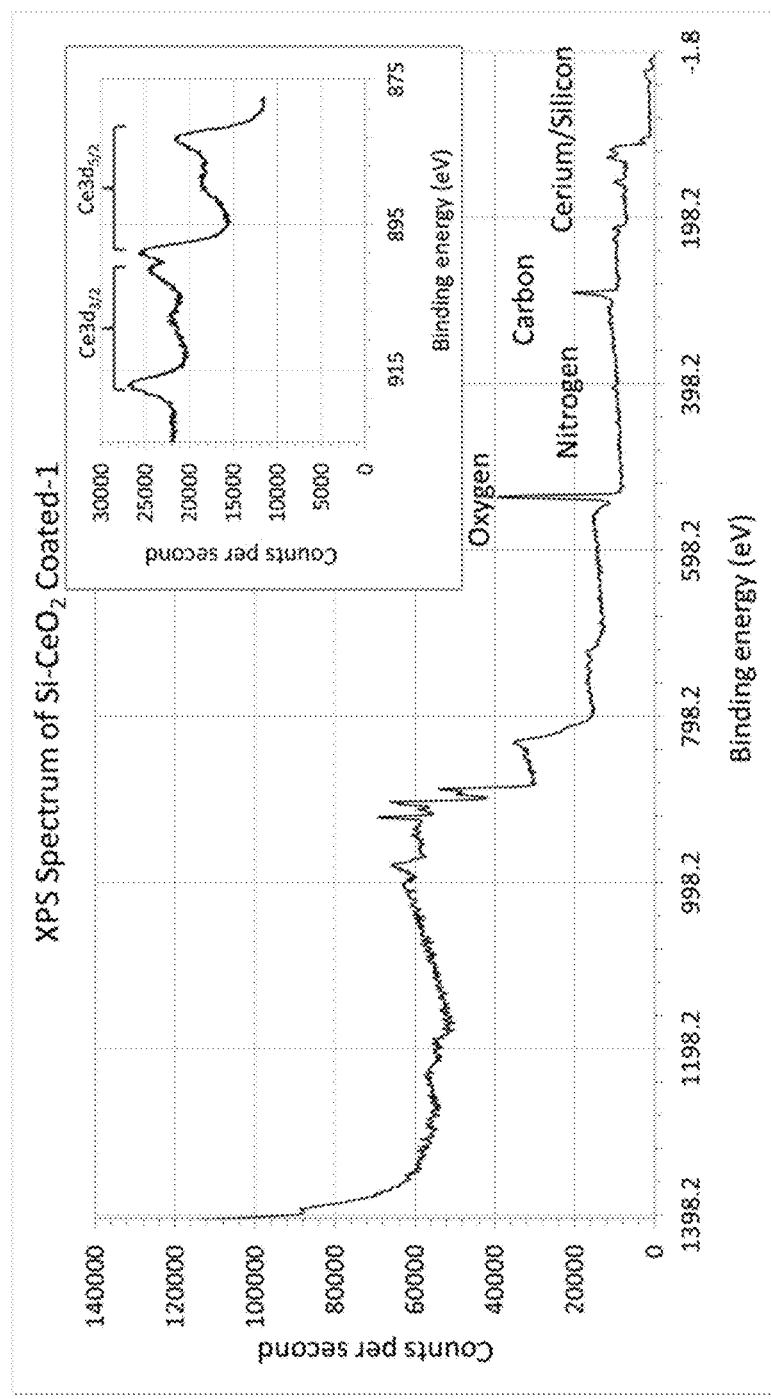
FIG. 7 shows the x-ray photoelectron spectroscopy (XPS) spectrum of example $CeO_2$ coated Si particles.

FIG. 7 is an XPS (X-ray photoelectron spectroscopy) spectrum of $CeO_2$ coated Si particles. The inset shows the XPS peaks correspond to $Ce^{4+}$ oxidation state. The Ce 3d XPS spectra showed the presence of $Ce^{4+}$, which confirms the formation of $CeO_2$ after heat treatment. Based on XPS data, typically, Ce (IV) has a peak at 917 eV which is absent in the Ce (III) spectrum. Additionally, Ce (III) and Ce (IV) spectra have different multiplet splitting. The presence of the peak at 917 eV and unique multiplet corresponding to $Ce^{4+}$ indicate that the surface of Si particles is coated with $CeO_2$.

Figure 8:
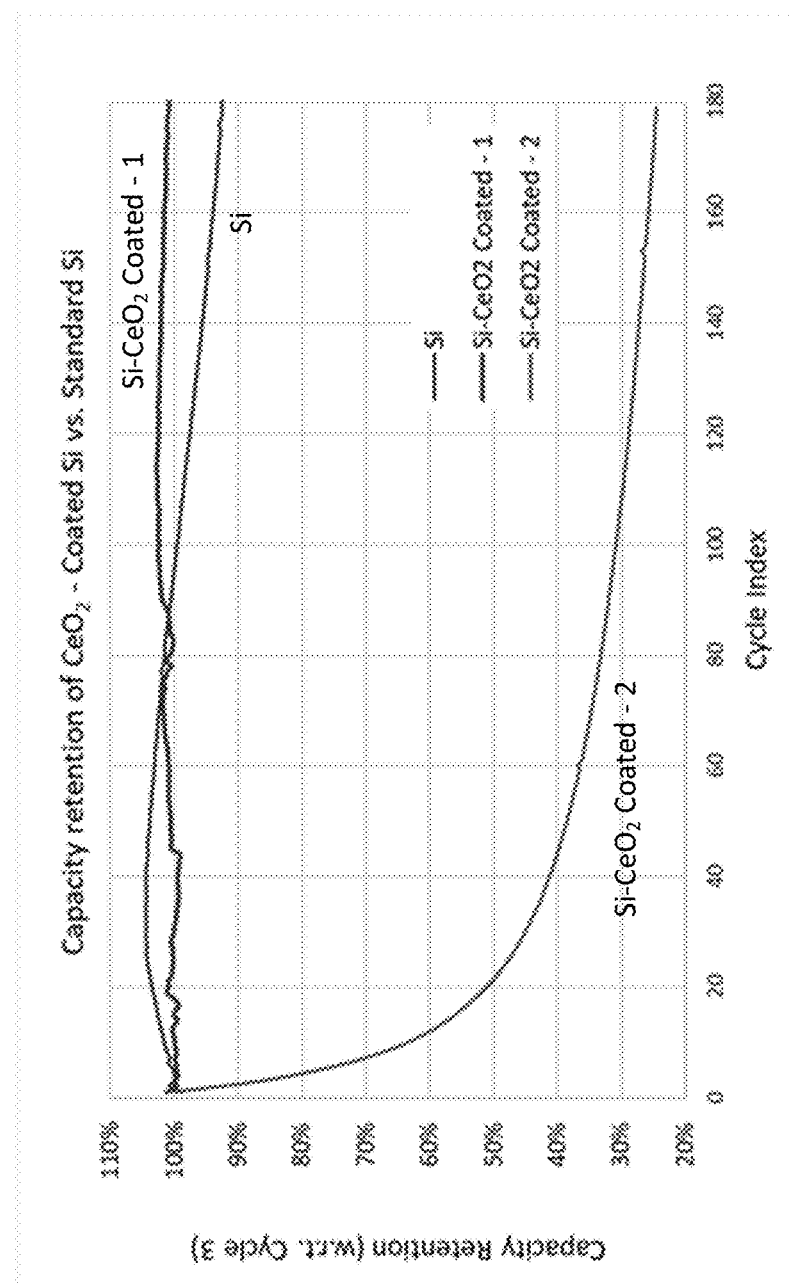
FIG. 8 shows the long term cycle performance of example cells with anodes prepared with $CeO_2$ coated Si particles.

$CeO_2$ coated Si microparticles were used to fabricate Si-dominant (>50%) anode composite films. The electrochemical performance of the anodes against NCA cathodes was evaluated at ambient temperature. Different composition/thickness of $CeO_2$ on Si particles showed a trend in cycle life performance. For example, FIG. 8 shows the capacity retention vs. cycles for cells with anodes using a composition of precursor materials to deposit a $CeO_2$ layer on Si particles with a thickness of about 5-60 nm (Si—$CeO_2$ Coated-1) compared to cells with bulk Si anodes (Si). Anodes with $CeO_2$-coated Si particles (Si—$CeO_2$ Coated-1) showed superior cyclability with over 200 charge-discharge cycles with minimum cycle fading. Incorporation of a $CeO_2$ coating with a thickness of >500 nm (Si—$CeO_2$ Coated-2), however showed deteriorated performance over long-term cycling. Without being bound by theory, the thicker coating may have attributed to low electronic conductivity of the $CeO_2$ coating, which can adversely affect electrochemical performance.

Figure 9:
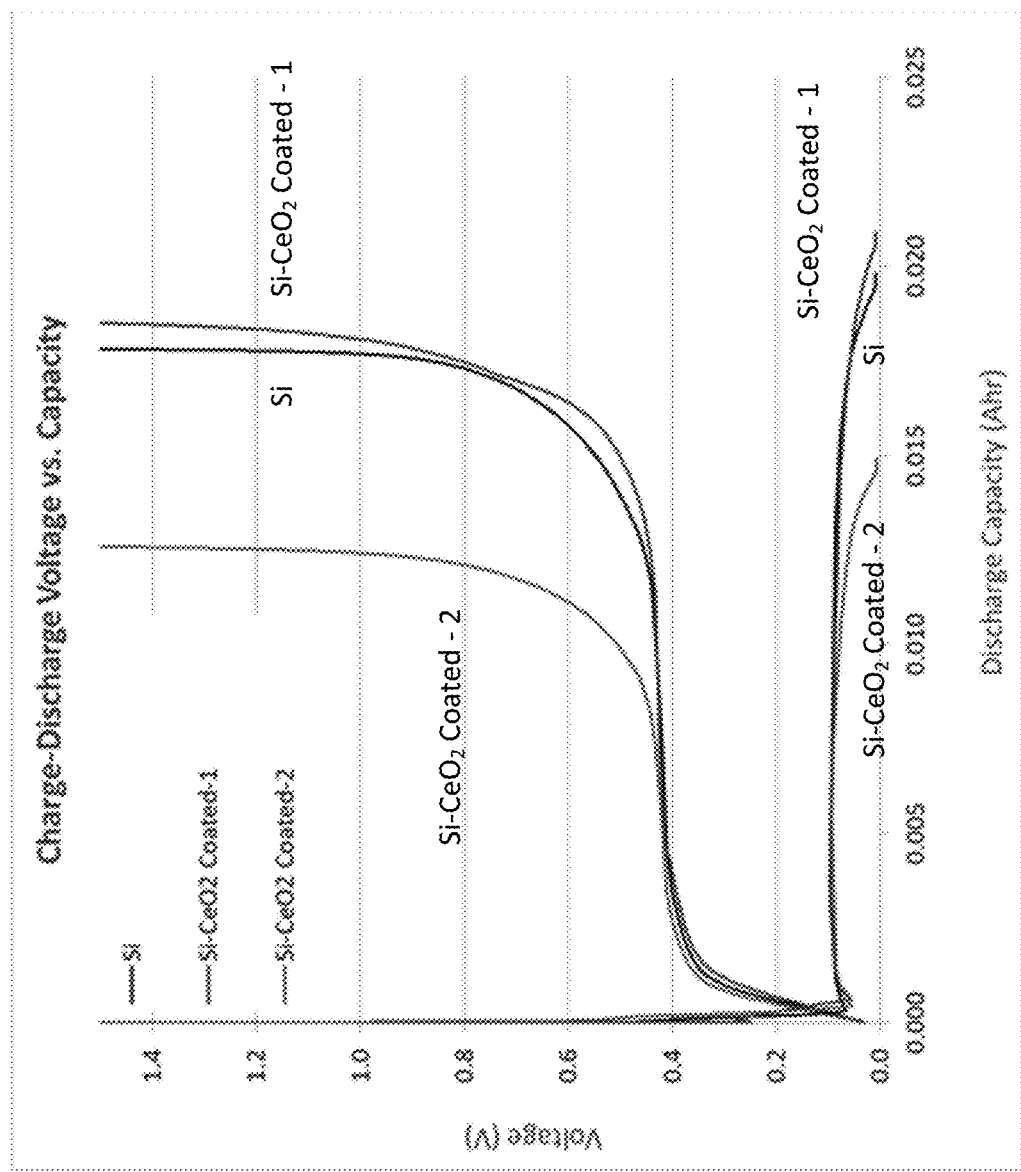
FIG. 9 shows the voltage profile of example cells with anodes prepared with $CeO_2$ coated Si particles.

FIG. 9 shows the voltage profile of the cells with anodes having $CeO_2$ coated Si microparticles compared with cells with anodes having uncoated Si microparticles. The Si-anodes contained about 80 wt. % Si, 5 wt % graphite, and 15 wt % glassy carbon (from resin) with an average loading of about 3.8 mg/cm$^2$. Specific capacity of the cells with $CeO_2$ coated Si particles was obtained by charging and discharging full cells at a rate of 0.025 C. The cell with the Si—$CeO_2$ Coated-1 sample exhibited a slight increase in capacity, which may be due to the contribution of the capacity of $CeO_2$ to the overall capacity. However, the cells with the Si—$CeO_2$ Coated-2 sample exhibited the lowest capacity, which may be attributed to the lower conductivity of the electrodes due to thicker oxide coating on the Si particles.

Example Metal Oxide Additives

Figures 10A, 10B:
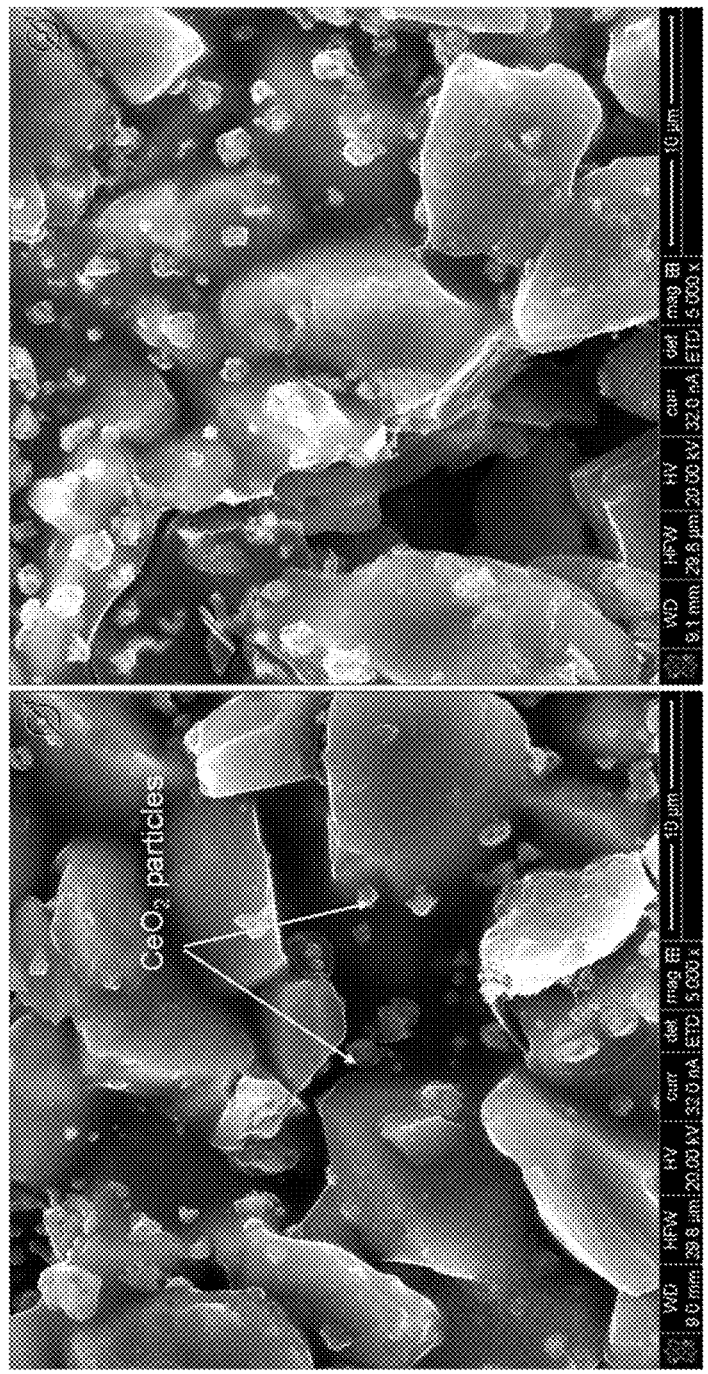
FIGS. 10A and 10B are SEM images of an example Si—$CeO_2$ composite electrode with $CeO_2$ particles as an additive.
Figure 11:
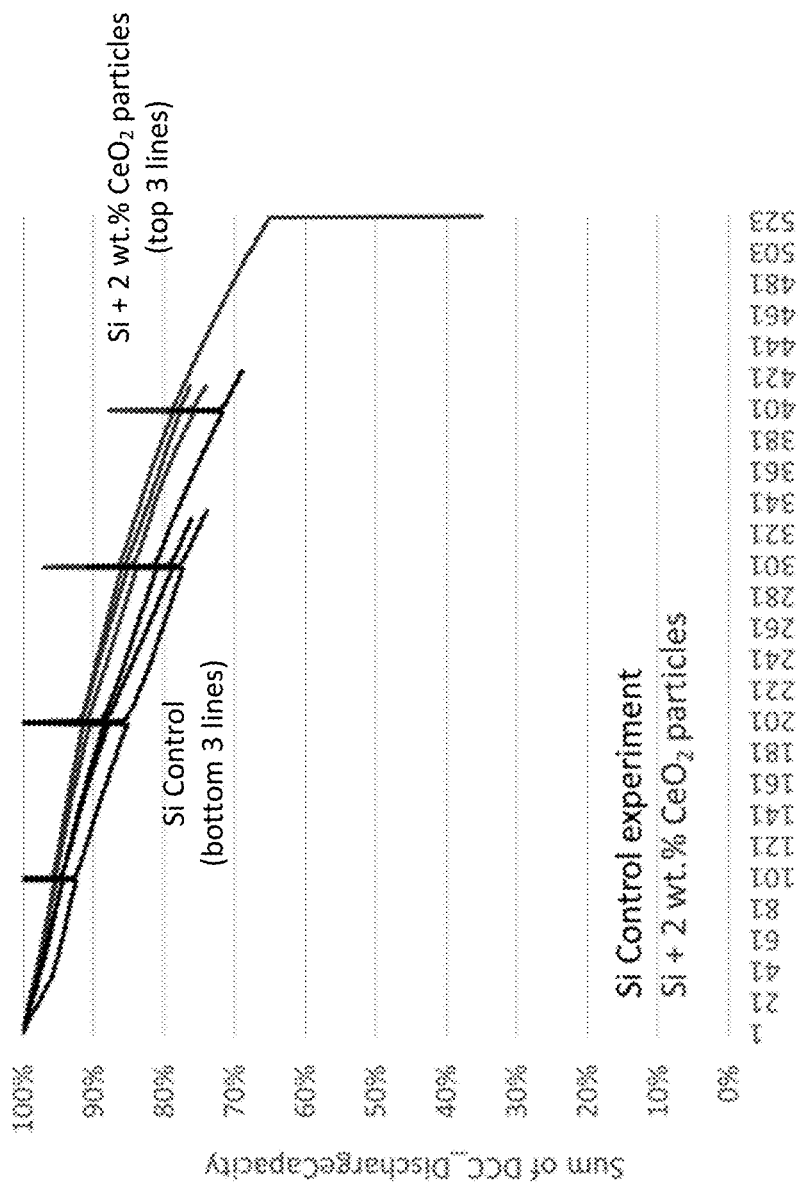
FIG. 11 shows the long term cycle performance of example cells with anodes prepared with $CeO_2$ particles as an additive.

Composite material electrode films were prepared with $CeO_2$ particles as an additive. The electrochemically active material included $CeO_2$ particles (nanoparticles and/or microparticles) incorporated with Si particles. The $CeO_2$ particles attached onto and/or coated the surface of the Si particles and were embedded within a carbon matrix. FIGS. 10A and 10B are SEM images of an example Si—$CeO_2$ composite electrode using $CeO_2$ as an additive. FIG. 11 shows the long term cycle performance (performance at high rate charging of 4 C and a voltage window of 4.2-3.2V) of example cells with anodes prepared with $CeO_2$ particles as an additive (Si+2 wt % $CeO_2$ particles). The cells with $CeO_2$ particles as an additive (top 3 lines) showed improved cycle life compared to cells with a control Si anode.

As described herein, certain implementations can include electrochemically active material including metal oxide coated electrochemically active particles and/or metal oxide particles as an additive. By providing a coating on the surface of the electrochemically active particles, various implementations described herein can advantageously provide increased cycle life (including high temperature cycle life), increased energy density, increased safety, increased capacity, and/or decreased electrolyte consumption.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of preparing an electrochemically active material, comprising:
    providing electrochemically active particles;
    coating the particles with a binder;
    exposing the particles to a source of metal;
    forming metal salt on the surface of the particles from the source of metal; and
    heating the metal salt to form metal oxide coated particles, wherein the metal oxide comprises a conformal cerium oxide layer over the electrochemically active particles, and wherein the metal oxide is without cerium oxide aggregates; and
    wherein the binder comprises a surfactant comprising at least one of sodium dodecylsulfonate, sodium dodecylbenzenesulfonate, sodium dialkylsulfosuccinate, alkylbenzene sulfonates, alcohol ether sulfates, secondary alkane sulfonates, and cetyltrimethylammonium bromide (CTAB).

2. The method of claim 1, wherein the electrochemically active particles comprise at least one of silicon particles, germanium particles, graphite particles, and particles of an alloy metal.

3. The method of claim 1, wherein the electrochemically active material comprises silicon particles at greater than about 50% to about 99% by weight.

4. The method of claim 1, wherein the particles have a median particle size (D50) greater than about 1 µm to about 50 µm.

5. The method of claim 1, wherein the binder comprises a polymer having a molecular weight in the range of about 20,000 g/mol to about 40,000 g/mol.

6. The method of claim 5, wherein the polymer has an ethylene backbone.

7. The method of claim 1, further comprising adding metal oxide particles with the metal oxide coated particles.

8. The method of claim 7, wherein the metal oxide particles have a median particle size (D50) in the range of about 20 nm to about 2 µm.

9. The method of claim 1, wherein the metal oxide comprises $CeO_x$, wherein $1 \leq x \leq 2$.

10. The method of claim 9, wherein the source of metal for the metal oxide comprises at least one of ammonium cerium nitrate, cerium (IV) sulfate, cerium (III) nitrate hexahydrate, cerium (III) chloride heptahydrate, cerium trifluoromethanesulfonate, cerium (III) sulfate octahydrate, ammonium cerium (IV) sulfate dihydrate, cerium (III) sulfate, cerium (IV) sulfate tetrahydrate, cerium (III) acetate hydrate, and ammonium cerium (IV) nitrate.

11. The method of claim 9, wherein the source of metal for the metal oxide comprises a cerium-doped material.

12. The method of claim 11, wherein the cerium-doped material comprises at least one of cerium (IV) oxide-yttria doped material, cerium-doped copper, cerium doped cobalt oxide, and cerium-doped indium oxide.

13. The method of claim 1, wherein the metal oxide comprises at least one of $TiO_2$, $Al_2O_3$, $MoO_2$, CuO, ZnO, $SnO_2$, $Nb_2O_5$, $RuO_2$, $IrO_2$, $TiNb_2O_7$, $Zn_xFe_yO_z$, wherein $1<x,y,z<4$, and M-$Li_xO$, wherein M is a transition metal and $0.1 \leq x \leq 2$.

14. The method of claim 1, wherein the metal salt comprises at least one of nitrates, nitrites, sulfates, sulfites, sulfonates, hydroxides, isopropoxides, oxyhydroxides, acetates, and carbonates.

15. The method of claim 1, further comprising exposing the particles to urea prior to forming the metal salt on the surface of the particles.

16. A method of making an electrode, comprising:
    providing the electrochemically active material prepared using the method of claim 1; and
    coating the electrochemically active material on a current collector with the binder.

17. A method of making an electrode, comprising:
    providing the electrochemically active material prepared using the method of claim 1;
    mixing the electrochemically active material with a precursor; and
    pyrolyzing the precursor to convert the precursor into one or more types of carbon phases to form a composite material film.

18. The method of claim 17, wherein the one or more types of carbon phases comprise at least one of hard carbon, soft carbon, and graphene.

19. The method of claim 17, wherein the composite material film is a self-supported composite structure.

* * * * *